United States Patent
Peshkin et al.

(10) Patent No.: US 9,122,325 B2
(45) Date of Patent: Sep. 1, 2015

(54) TOUCH INTERFACE DEVICE AND METHOD FOR APPLYING CONTROLLABLE SHEAR FORCES TO A HUMAN APPENDAGE

(75) Inventors: Michael A. Peshkin, Evanston, IL (US); J. Edward Colgate, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 7 days.

(21) Appl. No.: 13/468,695

(22) Filed: May 10, 2012

(65) Prior Publication Data
US 2012/0286847 A1 Nov. 15, 2012

Related U.S. Application Data

(60) Provisional application No. 61/484,544, filed on May 10, 2011, provisional application No. 61/484,564, filed on May 10, 2011.

(51) Int. Cl.
*G06F 3/041* (2006.01)
*G06F 3/01* (2006.01)

(52) U.S. Cl.
CPC .............. *G06F 3/041* (2013.01); *G06F 3/016* (2013.01); *G06F 3/0416* (2013.01)

(58) Field of Classification Search
CPC ........ G06F 3/041; G06F 3/016; G06F 3/0416
USPC ................... 345/156, 158, 173, 174; 341/22; 327/517; 340/407.1, 407.2; 463/30, 37; 178/18.03
See application file for complete search history.

(56) References Cited

U.S. PATENT DOCUMENTS

| | | | |
|---|---|---|---|
| 5,587,937 | A | 12/1996 | Massie et al. |
| 5,631,861 | A | 5/1997 | Kramer |
| 5,709,219 | A | 1/1998 | Chen et al. |
| 6,059,506 | A | 5/2000 | Kramer |
| 6,351,054 | B1 | 2/2002 | Cabuz et al. |

(Continued)

FOREIGN PATENT DOCUMENTS

| | | |
|---|---|---|
| JP | 2008-287402 | 11/2008 |
| WO | WO 2010/105001 | 9/2010 |
| WO | WO 2010/105006 | 9/2010 |
| WO | WO 2010/139171 | 12/2010 |

OTHER PUBLICATIONS

Chubb et al.; "ShiverPad: A Device Capable of Controlling Shear Force on a Bare Finger"; *Third Joint Eurohaptics Conference and Symposium on Haptic Interfaces for Virtual Environment and Teleoperator Systems*; Mar. 18-20, 2009; pp. 18-23.

(Continued)

*Primary Examiner* — Alexander Eisen
*Assistant Examiner* — Abhishek Sarma
(74) *Attorney, Agent, or Firm* — Cook Alex Ltd.

(57) ABSTRACT

A touch interface device includes a touch surface, an actuator, and an electrode. The actuator is coupled with the touch surface and is configured to move the touch surface in one or more directions. The electrode is coupled with the touch surface and is configured to impart a normal electrostatic force on one or more appendages of a human operator that engage the touch surface when an electric current is conveyed to the electrode. Movement of the touch surface by the actuator and the electrostatic force provided by the electrode are synchronized to control one or more of a magnitude or a direction of a shear force applied to the one or more appendages that engage the touch surface.

23 Claims, 9 Drawing Sheets

(56) References Cited

U.S. PATENT DOCUMENTS

| | | | |
|---|---|---|---|
| 6,429,846 B2 | 8/2002 | Rosenberg et al. | |
| 6,693,516 B1* | 2/2004 | Hayward | 340/407.1 |
| 6,970,160 B2 | 11/2005 | Mulligan et al. | |
| 6,979,164 B2 | 12/2005 | Kramer | |
| 7,148,875 B2* | 12/2006 | Rosenberg et al. | 345/156 |
| 7,271,707 B2 | 9/2007 | Gonzales | |
| 7,390,157 B2 | 6/2008 | Kramer | |
| 7,714,701 B2* | 5/2010 | Altan et al. | 340/407.1 |
| 7,742,036 B2 | 6/2010 | Grant | |
| 7,825,903 B2 | 11/2010 | Anastas et al. | |
| 8,253,306 B2 | 8/2012 | Morishima et al. | |
| 2001/0026266 A1 | 10/2001 | Schena et al. | |
| 2001/0043847 A1 | 11/2001 | Kramer | |
| 2003/0038776 A1 | 2/2003 | Rosenberg et al. | |
| 2004/0237669 A1 | 12/2004 | Hayward et al. | |
| 2005/0017947 A1 | 1/2005 | Shahoian et al. | |
| 2005/0030284 A1 | 2/2005 | Braun et al. | |
| 2005/0030292 A1 | 2/2005 | Diederiks | |
| 2005/0057527 A1 | 3/2005 | Takenaka et al. | |
| 2005/0173231 A1 | 8/2005 | Gonzales | |
| 2006/0115348 A1 | 6/2006 | Kramer | |
| 2006/0209037 A1 | 9/2006 | Wang et al. | |
| 2007/0146317 A1 | 6/2007 | Schena | |
| 2007/0236450 A1* | 10/2007 | Colgate et al. | 345/156 |
| 2007/0236474 A1 | 10/2007 | Ramstein | |
| 2008/0048974 A1* | 2/2008 | Braun et al. | 345/156 |
| 2008/0060856 A1 | 3/2008 | Shahoian et al. | |
| 2008/0062143 A1 | 3/2008 | Shahoian et al. | |
| 2008/0062144 A1 | 3/2008 | Shahoian et al. | |
| 2008/0062145 A1 | 3/2008 | Shahoian et al. | |
| 2008/0068351 A1 | 3/2008 | Rosenberg et al. | |
| 2008/0111447 A1 | 5/2008 | Matsuki | |
| 2008/0129705 A1 | 6/2008 | Kim et al. | |
| 2008/0218488 A1* | 9/2008 | Yang et al. | 345/173 |
| 2009/0036212 A1 | 2/2009 | Provancher | |
| 2009/0079550 A1 | 3/2009 | Makinen et al. | |
| 2009/0267920 A1* | 10/2009 | Faubert et al. | 345/177 |
| 2010/0085169 A1* | 4/2010 | Poupyrev et al. | 340/407.2 |
| 2010/0108408 A1 | 5/2010 | Colgate et al. | |
| 2010/0109486 A1* | 5/2010 | Polyakov et al. | 310/365 |
| 2010/0141407 A1 | 6/2010 | Heubel et al. | |
| 2010/0149111 A1 | 6/2010 | Olien | |
| 2010/0156818 A1 | 6/2010 | Burrough et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1* | 9/2010 | Cruz-Hernandez et al. | 345/174 |
| 2010/0309142 A1* | 12/2010 | Cruz-Hernandez et al. | 345/173 |
| 2011/0012717 A1 | 1/2011 | Pance et al. | |
| 2011/0043477 A1* | 2/2011 | Park et al. | 345/174 |
| 2011/0079449 A1* | 4/2011 | Radivojevic | 178/18.03 |
| 2011/0128239 A1* | 6/2011 | Polyakov et al. | 345/173 |
| 2011/0187658 A1* | 8/2011 | Song et al. | 345/173 |
| 2011/0215914 A1* | 9/2011 | Edwards | 340/407.2 |
| 2011/0267294 A1* | 11/2011 | Kildal | 345/173 |
| 2011/0285667 A1* | 11/2011 | Poupyrev et al. | 345/174 |
| 2012/0038559 A1* | 2/2012 | Radivojevic et al. | 345/173 |
| 2012/0038568 A1 | 2/2012 | Colloms et al. | |
| 2012/0062516 A1 | 3/2012 | Chen et al. | |
| 2012/0126959 A1 | 5/2012 | Zarrabi et al. | |
| 2012/0206248 A1 | 8/2012 | Biggs | |
| 2012/0206371 A1* | 8/2012 | Turunen et al. | 345/173 |
| 2012/0232780 A1* | 9/2012 | Delson et al. | 701/400 |
| 2012/0268386 A1* | 10/2012 | Karamath et al. | 345/173 |
| 2012/0268412 A1 | 10/2012 | Cruz-Hernandez et al. | |
| 2013/0044049 A1* | 2/2013 | Biggs et al. | 345/156 |

OTHER PUBLICATIONS

Chubb et al.; "ShiverPaD: A Glass Haptic Surface that Produces Shear Force on a Bare Finger"; *Transactions on Hapics*; 2010; pp. 1-10; vol. X, No. X.

Minsky; "Computational Haptics: The *Sandpaper* System for Synthesizing Texture for a Force-Feedback Display"; PhD Thesis; Massachusetts Institute of Technology, Cambridge, MA; Jul. 6, 1995; pp. 1-217.

http://niremf.ifac.cnr.it/tissprop/htmlclie/htmlclie.htm; Sep. 20, 2012; pp. 1-3.

www.senseg.com; Sep. 20, 2012; pp. 1-2.

http://www.teslatouch.com/; Sep. 20, 2012; pp. 1-4.

ISR and WO for PCT/US2012/037333 dated Dec. 28, 2012.

Kaczmarek, K., J. Webster, P. Pach-y-Rita, and W. Tompkins, *Electrotactile and vibrotactile displays for sensory substitution systems*. IEEE Transactions on Biomedical Engineering, 1991. 38(1): pp. 1-16.

Tang, H. and D. Beebe, *A microfabricated electrostatic haptic display for persons with visual imairments*. IEEE Transactions on Rehabilitation Engineering, 1998. 6(3): pp. 241-248.

Mallinckrodt, E., A. Hughes, and W. Sleator, *Perception by the Skin of Electrically Induced Vibrations*. Science, 1953. 118(3062): pp. 277-278.

A. Yamamoto, T. Ishii, and T. Higuchi, "Electrostatic tactile display for presenting surface roughness sensation," in *Industrial Technology, 2003IEEE International Conf. on*, Dec. 2003, pp. 680-684.

M. Takasaki, H. Kotani, T. Mizuno, and T. Nara, "Transparent surface acoustic wave tactile display," in *International Conf. on IntelligentRobots and Systems*, Aug. 2005, pp. 3354-3359.

T. Watanabe and S. Fukui, "A method for controlling tactile sensation of surface roughness using ultrasonic vibration," in *Proc. of IEEE International Conf. on Robotics and Automation*, vol. 1, May 1995, pp. 1134-1139 vol. 1.

M. Biet, F. Giraud, and B. Lemaire-Semail, "Implementation of tactile feedback by modifying the perceived friction," *The European PhysicalJournal Applied Physics*, vol. 43, No. 1, pp. 123-135, Jul. 2008.

L. Winfield, J. Glassmire, J. E. Colgate, and M. Peshkin, "T-pad: Tactile pattern display through variable friction reduction," in *World Haptics Conf.*, 2007, pp. 421-426.

D. Wang, K. Tuer, M. Rossi, and J. Shu, "Haptic overlay device for flat panel touch displays," in *Symposium on Haptic Interfaces for Virtual Environment and Teleoperator Systems*, 2004.

E. C. Chubb, J. E. Colgate, and M. A. Peshkin, "Shiverpad: A device capable of controlling shear force on a bare finger," in *Proc. of the WorldHaptics Conf*, 2009, pp. 18-23.

E. C. Chubb, "Shiverpad: A haptic surface capable of applying shear forces to bare finger," Master's thesis, Northwestern University, Evanston, IL, USA, 2009.

Y. Kato, T. Sekitani, M. Takamiya, M. Doi, K. Asaka, T. Sakurai, and T. Someya, "Sheet-type braille displays by integrating organic field-effect transistors and polymeric actuators," *IEEE Transactions on Electron Devices*, vol. 54, No. 2, pp. 202-209, Feb. 2007.

Pasquero and V. Hayward, "Stress: A practical tactile display with one millimeter spatial resolution and 700 hz refresh rate," in *Proc. of Eurohaptics*, Jul. 2003.

V. Vincent Levesque and V. Hayward, "Experimental evidence of lateral skin strain during tactile exploration," in *Proc. of Eurohaptics*, Jul. 2003.

C. Harrison and S. E. Hudson, "Providing dynamically changeable physical buttons on a visual display," in *Proc. of the 27th international conf. on Human factors in computing systems*, 2009, pp. 299-308.

Reznik, D; Canny, J, (1998). A flat rigid plate is a universal planar manipulator. In IEEE International Conference on Robotics and Automation.

O. Bau, I. Poupyrev, A. Israr, and C. Harrison, "TeslaTouch: Electrovibration for Touch Surfaces," *User Interface Science and Technology (UIST)*, Oct. 3-6, 2010. New York.

S. Grimnes, "Electrovibration, cutaneous sensation of microampere current," *Acta. Physiol. Scand.*, vol. 118, No. 1, pp. 19-25, Jan. 1983.

K. Kaczmarek, "Electrotactile display of computer graphics for bline—final report," National Eye Institute grant 5-R01-EY10019-08, Dec. 23, 2004.

K. Kaczmarek, K. Nammi, A.K. Agarwal, M.E. Tyler, S.J. Haase, and D.J. Beebe. "Polarity effect in electrovibration for tactile display." IEEE Trans on Biomedical Engineering, 53(10):2047-2054, 2006.

(56) References Cited

OTHER PUBLICATIONS

R. M. Strong and D. E. Troxel, "An electrotactile display," *IEEE Trans. Man—Mach Syst.*, vol. MMS-11, No. 1, p. 72-79, 1970.

S. M. Biggs, S. *Haptic Interfaces*, chapter 5, pp. 93-115. Published by Lawrence Erlbaum Associates, 2002.

M. Minsky, *Compulational Haptics: The Sandpaper System for Synthesizing texture for a force feedback display*. PhD thesis, Massachusetts Institute of Technology, Cambridge, MA, 1995.

G. Robles-De-La-Torre. Comparing the Role of Lateral Force During Active and Passive Touch: Lateral Force and its Correlates are Inherently Ambiguous Cues for Shape Perception under Passive Touch Conditions. pp. 159-164, 2002.

G. Robles-De-La-Torre and V. Hayward. Force can overcome object geometry in the perception of shape through active touch. Nature, 412:445-448, Jul. 2001.

J. Cerundolo, "Effect of Charge Migration in Electrostatic Tactile Displays," MS Thesis, Dept of Mechanical Engineering, Northwestern University, 2010.

http://niremf.ifac.cnr.it/tissprop/htmlclie/htmlclie.htm.

www.senseg.com.

http://www.teslatouch.com/.

Biet et al., Discrimination of Virtual Square Gratings by Dynamic Touch on Friction Based Tactile Displays, Symposium on Haptic Interfaces for Virtual Teleoperator Systems, pp. 41-48, 2008.

Biet et al., Implementation of tactile feedback by modifying the perceived friction, The European Physical Journal Applied Physics vol. 43, No. I, pp. 123-135, Jul. 2008.

Minsky, Feeling and Seeing:Issues in Force Display, Symposium on Interactive 30 Graphics, Proceedings of 1990 symposium on interactive 30 graphics, Snowbird, Utah, p. 235-243,270 1990.

Winfield, A Virtual Texture Display using Ultrasonically Vibrating Plates, Paper [online], Nov. 2007, [retrieved on Dec. 4, 2010]. Http://vroot.org/node/4707.

Goethals, Tactile Feedback for Robot Assisted Minimally Invasive Surgery: An Overview, paper [online], Jul. 2008.

\* cited by examiner

TOUCH INTERFACE DEVICE AND METHOD FOR APPLYING CONTROLLABLE SHEAR FORCES TO A HUMAN APPENDAGE

CROSS-REFERENCE TO RELATED APPLICATIONS

This application claims priority benefit of U.S. Provisional Application No. 61/484,544, which was filed on 10-May-2011 and is entitled "A Touch Interface Device Able To Apply Controllable Shear Forces To A Human Appendage" (referred to herein as the "'544 Application"). This application is related to U.S. Provisional Application No. 61/484,564, which also was filed on 10-May-2011 and is entitled "A Touch Interface Device Having An Electrostatic Multitouch Surface" (referred to herein as the "'564 Application"), and is related to U.S. application Ser. No. 13/468,818, which is filed concurrently with the present application and is entitled "A Touch Interface Device Having An Electrostatic Multitouch Surface And Method For Controlling The Device" (referred to herein as the "'818 Application"). The entire disclosures of the '544 Application, the '564 Application, and the '818 Application are incorporated by reference.

STATEMENT REGARDING FEDERALLY SPONSORED RESEARCH OR DEVELOPMENT

This invention was made with government support under grant numbers IIS0941581 and IIS0964075 awarded by the National Science Foundation. The government has certain rights in the invention.

BACKGROUND

Touch interface devices can include computing devices having touch sensitive surfaces used to receive input from operators of the devices. For example, many smart phones, tablet computers, and other devices have touch sensitive surfaces that identify touches from operators as input to the devices.

Some of these devices have smooth touch surfaces with an approximately constant friction across the entire surface. Some other known devices have the ability to change the friction forces experienced by a fingertip on the surface. The friction forces may be controllably reduced by introducing ultrasonic vibrations perpendicular to the plane of the surface. The vibrations may be mechanically generated using ultrasound transducers (e.g., piezoelectric elements). A limitation of these devices is that friction is a resistive force, meaning that the friction force opposes the motion of the fingertip. Yet other known devices may apply shear forces to the fingertip in a variety of directions, and not just in directions that oppose motion of the fingertip. These devices may generate the forces by synchronizing in-plane vibrations of the touch surface with the gating (e.g., switching) on and off of ultrasonic vibrations that control the magnitude of the friction. Due to the time required to gate on and off ultrasonic vibrations, however, the frequencies at which the in-plane vibrations occur may be limited.

Moreover, mechanically producing the vibrations can generate acoustic noise that can be undesirable. Additionally, the extent of variation of frictional forces that are achievable by the use of mechanical vibrations may be limited.

The shear forces supplied by some of these known devices may be constant or approximately constant across the entire touch surface at any moment of time. For example, these devices may be incapable of providing different shear forces on different fingertips that concurrently or simultaneously touch the same surface of the device.

BRIEF DESCRIPTION

In one embodiment, a touch interface device includes a touch surface, an actuator, and an electrode. The actuator is coupled with the touch surface and is configured to move the touch surface in one or more directions. The electrode is coupled with the touch surface and is configured to impart a normal electrostatic force on one or more appendages of a human operator that engage the touch surface when an electric current is conveyed to the electrode. Movement of the touch surface by the actuator and the electrostatic force provided by the electrode are synchronized to control one or more of a magnitude or a direction of a shear force applied to the one or more appendages that engage the touch surface.

In another embodiment, a method (e.g., for controlling shear forces applied to an appendage that touches a touch interface device) includes receiving a touch on a touch surface in a touch interface device by one or more appendages of a human operator, moving the touch surface in one or more directions, and applying an electric current to the electrode to impart a normal electrostatic force on the one or more appendages of the human operator. Moving the touch surface and applying the electric current are synchronized to control one or more of a magnitude or a direction of a shear force applied to the one or more appendages that engage the touch surface.

In another embodiment, another touch interface device includes a touch surface, an electrode, and an actuator. The electrode is coupled with the touch surface. The actuator is coupled with the touch surface and is configured to move the touch surface in order to generate a shear force on one or more appendages of an operator that touch the touch surface. The electrode is configured to receive an electric current to impart an electrostatic force on the one or more appendages and a direction and magnitude of the shear force on the one or more appendages are controlled by movement of the touch surface and application of the electrostatic force.

BRIEF DESCRIPTION OF THE DRAWINGS

The subject matter described herein will be better understood from reading the following description of non-limiting embodiments, with reference to the attached drawings, wherein below.

DETAILED DESCRIPTION

Figure 1:
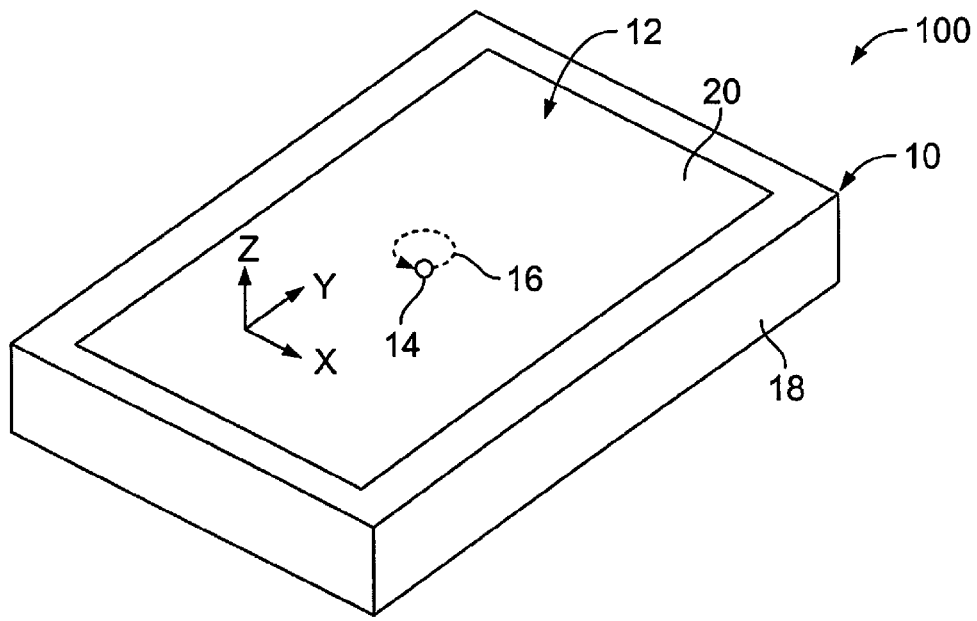
FIG. 1 is a perspective view of a haptic system that includes a touch interface device in accordance with one embodiment.

In accordance with one or more embodiments described herein, haptic effects can be created in a touch device by modulating shear forces applied to a fingertip as a function of finger location, finger velocity, and/or finger acceleration. The shear forces are controlled by moving (e.g., swirling and/or rotating) a touch surface and/or applying electrostatic forces to the fingertip. The haptic effects can provide an operator of the device with feelings of his or her fingertip being moved, resisted from being moved, or otherwise physically impacted by the touch surface.

For example, to create haptic experiences that are useful and/or interesting, shear forces can be applied to fingertips that correspond to specific actions of the fingertips and/or to specific events occurring under software control. By way of illustration, consider a game in which the fingertips are used both to bat a virtual ball, and to capture the ball displayed on a touch screen of an electronic device. Consider the act of batting the ball with one finger. In this case, the force generated by the methods described here would depend on both the position and velocity of the finger as well as the position and velocity of the simulated ball. The force exerted on the finger by the device might increase when the position of the finger intersects that of the surface of the ball, indicating a collision. The force might also depend on the relative velocity of the finger and the ball, increasing for higher velocities. The force may not be a simple vibration that varies strictly as a function of time, but can be an active force that varies as a function of state variables such as positions, velocities, and accelerations. In the case of "catching" and "holding" the ball, the reaction forces at the two fingers (which can be functions of state variables such as positions and velocities) can point (e.g., be oriented) in approximately opposite directions. As the ball is held, the forces should persist. The force may be neither a simple vibration nor a transient force. One or more embodiments of the subject matter described herein generate persistent forces and/or different forces at different fingers. In the above discussion, it should be apparent that the technology described here has been integrated with means of measuring the position of one or more fingertips, and with means of displaying graphic images (and also audio, since events like batting a ball are often accompanied by sound). There are many techniques for measuring fingertip positions which may be used here. These include, without limitation, resistive, surface capacitive, projected capacitive, infrared, acoustic pulse recognition, and in-cell optical sensing. There are also many techniques for displaying graphic images and audio. Most of these combine easily with the electrostatic normal force modulation described here, but capacitive and projective capacitive sensing might seem to interfere with the rapidly varying electric fields used in friction modulation. However capacitive and projective capacitance sensing may be done at a much higher frequency, in the megahertz range, with filtering to separate the signals related to capacitive sensing from those resulting from actuation. In another embodiment, actuation of electrodes for producing haptic effects and sensing touch using the same electrodes may be performed using one or more of the embodiments described in the '818 Application, such as with the embodiments described in connection with FIGS. 15 through 19 of the '818 Application. It may be desirable to use the same electrodes for both purposes.

FIG. 1 is a perspective view of a haptic system 100 that includes a touch interface device 10 in accordance with one embodiment. In accordance with one or more embodiments described herein, the system 100 includes a planar, touch interface device 10 that actively applies forces on an appendage (e.g., a fingertip 200 shown in FIG. 3) of a human body that touches a touch surface 12 of the interface device 10. The forces that are applied to the appendage can be used to produce haptic effects that communicate, convey, or otherwise represent information for the operator. In one embodiment, the touch surface 12 may be the surface of a screen or other portion 20 of the device 10 that is exposed (e.g., accessible for an operator to touch). The touch surface 12 of the device 10 includes the top or exposed surface that is touched by an operator. As described below, the touch surface can be an insulating layer that covers electrodes that are coupled to a screen, surface, or other portion of the device 10. Alternatively, the touch surface 12 can be the exposed portion of the screen, surface, or other portion of the device 10, with the electrodes being disposed within the thickness of the touch surface or coupled to a bottom or unexposed side of the touch surface. The surface 12 can be a touch sensitive surface that senses engagement of the surface 12 by appendages of the operator. Alternatively, the surface 12 may not be sensitive to touch. The screen 20 may be a display screen of the interface device 10 that displays images, graphics, videos, and the like, while also sensing touch of the operator. Alternatively, the screen 20 may be a touch surface that does not also visually display images, graphics, videos, and the like. For example, the screen 20 may represent another portion of the interface device 10 that an operator may touch. The interface device 10 includes an outer housing or frame 18 that is coupled with and/or extends around the touch surface 12. This outer housing 18 can represent one or more portions of the interface device 10 that are grasped or handled by an operator, that are affixed to another component or object when mounting or securing the interface device 10. While the discussion herein focuses on a human fingertip as this appendage, it should be understood that other appendages, such as toes, can be used. It is also possible to mount the haptic systems disclosed here to a body surface, such as the forearm or back, for the purpose of conveying haptic information to the body. Additionally, the device 10 may apply forces to one or more other objects that are placed on the surface of the interface device 10. Moreover, while the discussion herein focuses on using glass as the surface of the interface device, alternatively, another type of surface can be used. The interface device 10 can be used as an input device for an electronic component. By way of example only, the interface device 10 may be a touch screen for a mobile phone, tablet computer, another type of computer, a control apparatus for a system (e.g., a touch screen interface to control computerized systems), and the like. Alternatively, the device 10 may itself represent the phone, computer, or apparatus and the touch surface 12 may represent the touch screen.

In one embodiment, the interface device 10 uses a combination of motion of the touch surface 12 (referred to herein as "swirling") and modulation of a normal force that is applied onto the fingertip that engages the touch surface 12 to produce a controllable shear force. This shear force may be used to "push" or guide the fingertip in a desired or designated direction along the touch surface 12. As described below, the swirling motion of the touch surface 12 can involve in-plane vibrations or other movements of the touch surface 12 in one or more directions. The normal force applied to the fingertip may be generated using electrostatic attraction or electrostatic forces. As used herein, the term "electrostatic attraction" refers to electrostatic interaction or forces between two or more bodies, such as the touch surface 12 and a human appendage.

Consider the friction force between a fingertip and the touch surface 12, assuming that the fingertip and the touch surface 12 are in contact, but moving relative to each other. Let $v_{finger}$ and $v_{surface}$ represent the two-dimensional velocity vectors of the fingertip and of the touch surface 12, respectively, in the plane of contact between the fingertip and the touch surface 12, such as a plane that is parallel to or coextensive with the touch surface 12. According to the Coulomb model of kinetic friction, the friction force acting on the fingertip can be expressed as:

$$F = \mu N \frac{(v_{surface} - v_{finger})}{|v_{surface} - v_{finger}|} \quad \text{(Equation \#1)}$$

where F represents a two-dimensional vector of the friction force acting on the fingertip, N represents the normal force pressing the fingertip and the touch surface 12 together, μ is the coefficient of friction of the touch surface 12, $v_{surface}$ represents a two-dimensional velocity vector of the touch surface 12, and $v_{finger}$ represents a two-dimensional velocity vector of the fingertip that engages the touch surface 12.

The magnitude and direction of the force vector (F) that acts on the fingertip may be controlled. In one embodiment, the magnitude and the direction of the force vector (F) can be controlled by moving the touch surface 12 in a swirling motion 16. The swirling motion of the touch surface 12 may be expressed as a time-changing (x, y) coordinate of a point of interest 14 on the touch surface 12. The coordinate of the point of interest 14 may be expressed as:

$$(x_o + \delta \cos(\omega_m t), y_o + \delta \sin(\omega_m t)) \quad \text{(Equation \#2)}$$

where $x_0$ represents an initial or current x-axis coordinate of the point of interest 14 along the x-axis illustrated in FIG. 1, $y_0$ represents an initial y-axis coordinate of the point of interest 14 along the y-axis illustrated in FIG. 1, δ represents an amplitude of the swirling motion 16, $\omega_m$ represents a frequency of the swirling motion 16 (referred to herein as a swirling frequency), and t represents time. The amplitude of the swirling motion 16 may be expressed as a radius or diameter (or other measurement of size) of a circular path taken by the point of interest 14 in a cycle of the swirling motion 16. In an embodiment, where the swirling motion 16 causes the point of interest 14 to take a non-circular path (e.g., a path of an ellipse, a polygon, or other shape), the amplitude of the swirling motion 16 may be expressed as another measurement of the size of the path taken by the point of interest 14, with the amplitude increasing for larger sized paths and decreasing for smaller sized paths. The swirling frequency may be expressed as a number of times that the point of interest 14 moves from a starting location, around the path defined by the swirling motion 16, and returns to the starting location, per unit time. For example, if the point of interest 14 moves through a circular (or other closed loop) path sixty times per second in the swirling motion 16, then the swirling frequency may be 60 hertz.

The $v_{surface}$ velocity vector of the touch surface 12 may be expressed as:

$$v_{surface} = \delta \omega \begin{bmatrix} -\sin \omega_m t \\ \cos \omega_m t \end{bmatrix} \quad \text{(Equation \#3)}$$

where δ represents the amplitude of the swirling motion 16, $\omega_m$ represents the swirling frequency, and t represents time. If the finger is not moving relative to the touch surface 12 (e.g., $v_{finger}$ is 0), the force vector (F) may be expressed as:

$$F = \mu N \begin{bmatrix} -\sin \omega_m t \\ \cos \omega_m t \end{bmatrix} \quad \text{(Equation \#4)}$$

where μ represents the coefficient of friction, N represents the normal force pressing the fingertip and the touch surface 12 together, $\omega_m$ represents the swirling frequency, and t represents time. The above expression of the force vector (F) is an equation for a force vector that is rotating at the swirling frequency $\omega_m$.

In order to control the magnitude and direction of the swirling force vector (F), the coefficient of friction (μ) and/or the normal force (N) may be modulated as a function of time. In one embodiment, the swirling frequency ($\omega_m$) may be relatively high, such as by being greater than a response bandwidth of vibration sensitivity in touch (e.g., ~1 kHz) and/or the response bandwidth of hearing (~20 kHz). Making the swirling frequency $\omega_m$ greater than the response bandwidth of hearing may allow for silent or at least relatively quiet operation of the device 10.

The coefficient of friction (μ) may be modulated using ultrasonic vibrations of the touch surface 12, such as is described in U.S. patent application Ser. No. 11/726,391 (the "'391 Application"). The entire disclosure of the '391 Application is incorporated by reference. The response bandwidth of friction variation through ultrasonic vibrations of the touch surface 12 may be limited, such as to frequencies of 1 kHz or less. The response bandwidth can be limited due to the time required to build up or decrease the ultrasonic vibrations of the touch surface 12.

The normal force (N) may be modulated as a function of time using electrostatic attractive forces between the fingertip and one or more conductive electrodes disposed beneath the touch surface 12, as described below. Modulation of the normal force (N) can occur at a relatively high rate. The normal force (N) can be modulated according to the expression:

$$N(t) = (N_o + 0.5 \Delta N) + 0.5 \Delta N \cos(\phi_x t + \phi) \quad \text{(Equation \#5)}$$

where N(t) represents the normal force between the fingertip and the touch surface 12 as a function of time, $N_0$ represents the normal force applied to the fingertip by the human operator's downward pressure (e.g., an operator-applied component of the normal force), ΔN represents a change in the normal force caused by the electrode beneath the touch surface 12 when the electrode is energized, $\omega_s$ represents a frequency at which the electrode is energized (e.g., the frequency at which the polarity of a voltage applied to the electrode is changed), $\phi$ represents a direction of the normal force, and t represents time. The frequency at which the electrode is energized also may be referred to as a switching frequency. The force vector (F) on the fingertip in the plane of the touch surface 12 may now be expressed as:

$$F = \mu((N_o + 0.5\Delta N) + 0.5\Delta N \cos(\omega_s t + \phi)) \begin{bmatrix} -\sin\omega_s t \\ \cos\omega_s t \end{bmatrix} \quad \text{(Equation \#6)}$$

If the energizing frequency ($\omega_s$) is relatively high, the force vector (F) may be expressed as a time average of the above expression. For example, the fingertip may be able to respond only to the average force because the remaining changes in the force vector (F) may occur too fast for the fingertip to respond. The time average force is may be expressed as:

$$F = \frac{\mu \Delta N}{4} \begin{bmatrix} \sin\phi \\ \cos\phi \end{bmatrix} \quad \text{(Equation \#7)}$$

where F represents the force vector acting on the fingertip having an amplitude of $$\frac{\mu \Delta N}{4}$$

and pointing in a direction $\phi$ relative to the positive y-axis of the touch surface 12 (e.g., in the plane of the touch surface 12). The force vector (F) can represent shear forces that are applied to the fingertip in the plane of the touch surface 12. The amplitude of the force vector on the fingertip may be controlled by changing $\Delta N$ and the direction of the force vector on the fingertip may be controlled by changing $\phi$.

In order to change the amplitude of the force vector (F), motion of the touch surface 12 can be synchronized with variation of the normal force acting between the fingertip and the touch surface 12. One way to control normal force is by modulating electrostatic attraction between the fingertip and one or more electrodes disposed below the touch surface 12. The electrostatic attraction can be used to increase an electrostatic normal force between the fingertip and the touch surface 12.

The interface device 10 can change the electrostatic normal force by changing electric energy that is supplied at or near the touch surface 12. For example, the interface device 10 can alter a voltage and/or turn a direct current on or off to change the electrostatic normal force. Varying the electrostatic normal force between the fingertip and the touch surface 12 can reduce the amount of audible noise generated by the device relative to other devices that use mechanical techniques. For example, relative to other interface devices that use ultrasonic transducers, modulating the normal force by changing an electric energy can produce little to no audible noise.

In one embodiment, changes to the supplied electric energy can occur at higher frequencies relative to devices that use mechanical techniques alone. As a result, changes to the supply of electric energy of one or more embodiments described herein can be varied at frequencies that are ultrasonic frequencies, or other frequencies that are beyond audible.

The swirling motion 16 of the touch surface 12 may be large enough that a velocity of the touch surface 12 exceeds a velocity at which the fingertip is moved on the touch surface 12. For example, the swirling motions or vibrations of the touch surface 12 may move the touch surface 12 at velocities of at least 10 centimeters per second (cm/s), although slower or faster velocities may be used. The frequency and amplitude at which the touch surface 12 is moved in the swirling motions or vibrations 16 may be varied and kept relatively small in order to allow relatively small mounting and sealing options for the touch surface 12. For example, with vibration frequencies of 1 kiloHertz (kHz), the vibration amplitudes may need to be at least 16 micrometers (μm) or larger. However, increasing the vibration frequencies up to 20 kHz or larger can reduce the vibration amplitudes to 0.8 μm or smaller.

In one embodiment, the interface device can vary the shear force, or the force vector (F), differently for two or more fingertips or other appendages that concurrently or simultaneously engage the touch surface 12. For example, changes in the shear forces or force vectors (F) can be controlled separately for each finger by separately controlling the electrostatic normal force on each finger.

Figure 2:
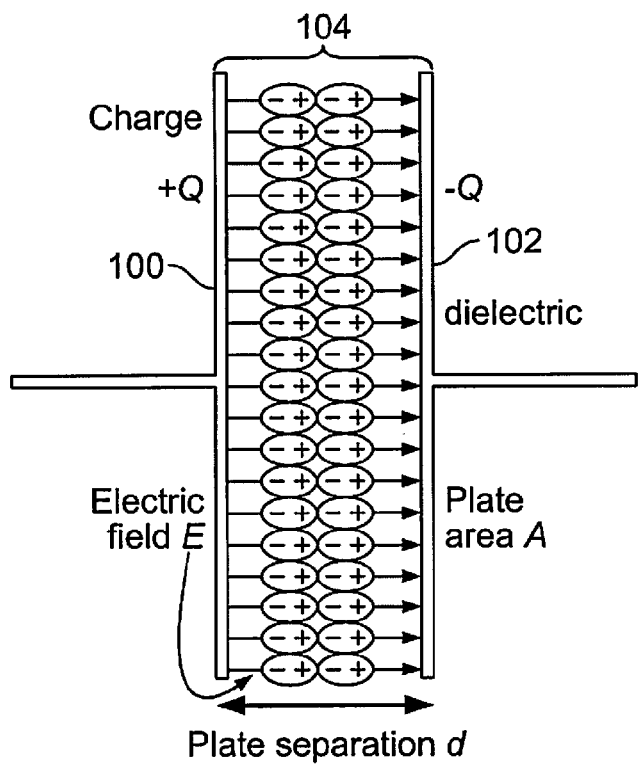
FIG. 2 is a schematic diagram of electrostatic force between two objects.

FIG. 2 is a schematic diagram of electrostatic force between two objects. The electrostatic force between two objects, such as between a fingertip and the touch surface 12 of the interface device 10 shown in FIG. 1 can be modeled as a parallel plate capacitor device 104. For example, in the illustrated example, a first object 100 can represent an electrode disposed on the touch surface 12 (and covered by an insulating or dielectric layer), below the touch surface 12 of the interface device 10 (e.g., inside the interface device 10 and on one side of the surface 12), or within a thickness of the touch surface 12. A second object 102 can represent a fingertip of a user that engages the touch surface 12. The objects 100, 102 are separated by a separation distance (d), which can include or represent the thickness dimension of the touch surface 12. An electric potential difference, or voltage, (V) is applied to create an electric field (E) between the objects 100, 102. The electric field (E) is related to the potential difference (V) across the objects 100, 102 divided by the separation distance (d). The dielectric constant may be assumed to be constant across the separation distance or may vary.

In one embodiment, the length across the objects 100, 102, or the surface area of interaction between the objects 100, 102, is relatively large compared to the separation distance (d). For example, the surface area of the object 100 that overlaps the surface area of the object 102 on opposite sides of the touch surface 12 may be relatively large compared to the separation between the objects 100, 102. The electrostatic normal force (F) between the objects 100, 102 may be modeled as a parallel plate capacitor based on the following relationship:

$$F = \frac{\varepsilon \varepsilon_o A V^2}{2d^2} \quad \text{(Equation \#8)}$$

where F represents the electrostatic normal force exerted on the object 102, $\varepsilon$ represents the relative permittivity (also known as the dielectric constant) of the touch surface 12 (and/or other components located in the separation distance between the objects 100, 102), $\varepsilon_o$ represents the permittivity of free space (8.85×10$^{-12}$ Farads per meter), A represents the surface area of interface between the objects 100, 102 (e.g., the overlap of the objects described above), V represents the potential difference across the objects 100, 102, and d represents the separation distance between the objects 100, 102. With respect to Equations 1, 4, 5, 6, and 7, the electrostatic normal force (F) may represent the normal force (N or $N_O$).

The electrostatic normal force (F) may be estimated by assuming that the dielectric constant ($\in$) is 5, the surface area (A) is $1\times10^{-4}$ square meters (m²), and the separation distance (d) is $1\times10^{-5}$ meters (m). Alternatively, other values may be used. For a potential difference (V) of 150 volts, the electrostatic normal force is approximately 0.5 Newtons. The coefficient of friction of skin on glass may be approximately unity, although the coefficient may be more or less depending on factors such as surface finish. As a result, average lateral forces of about 0.25 Newtons may be applied to the finger that touches the surface.

The electric field associated with the above parameters is $E=V/d=1.5\times10^7$ Volts per meter (V/m), which may be less than the breakdown strength of many insulators that may be used to form the touch surface 12, such as parylene ($2.8\times10^8$ V/m). Thus, even higher electric field strengths than $1.5\times10^7$ V/m may be feasible without exceeding the breakdown strength of the touch surface 12.

The electrostatic normal force between a fingertip and the touch surface 12 may increase with increasing frequencies at which the polarity of the voltage applied to generate the electric field is switched (e.g., the switching frequency $\omega_s$). The electrostatic normal force may increase with increasing switching frequency due to leakage or flow of electrostatic charges on the fingertip to the touch surface 12. For example, as the electrostatic charges flow to the touch surface 12 from the fingertip, the attractive force on the fingertip can decrease. The time required for the charges on the fingertip to migrate to the touch surface 12 can be about 200 microseconds (µs). For example, there may be appreciable electrostatic normal force on the fingertip for only about 200 µs before the normal force decreases due to charge leakage. After this time period, the normal force may significantly decrease unless the polarity of the voltage applied to generate the electric field is switched. For example, the normal force may decrease unless the voltage is frequency switched, such as from +150V to −150V. The time period before the normal force decreases due to charge leakage can vary based on the physical condition of the fingertip. For example, for relatively dry skin, the time period may decrease to 50 µs.

In order to avoid or reduce the leakage of charge from the fingertip to the touch surface 12 (and an accompanying decrease in the electrostatic normal force), the polarity of the voltage applied to generate the electric field may be changed or switched at fairly high frequencies, such as frequencies of at least 500 Hz, but preferably greater than 5 kHz. In one embodiment, a switching frequency of at least 50 kHz is used. Alternatively, a different switching frequency may be used.

Figure 3:
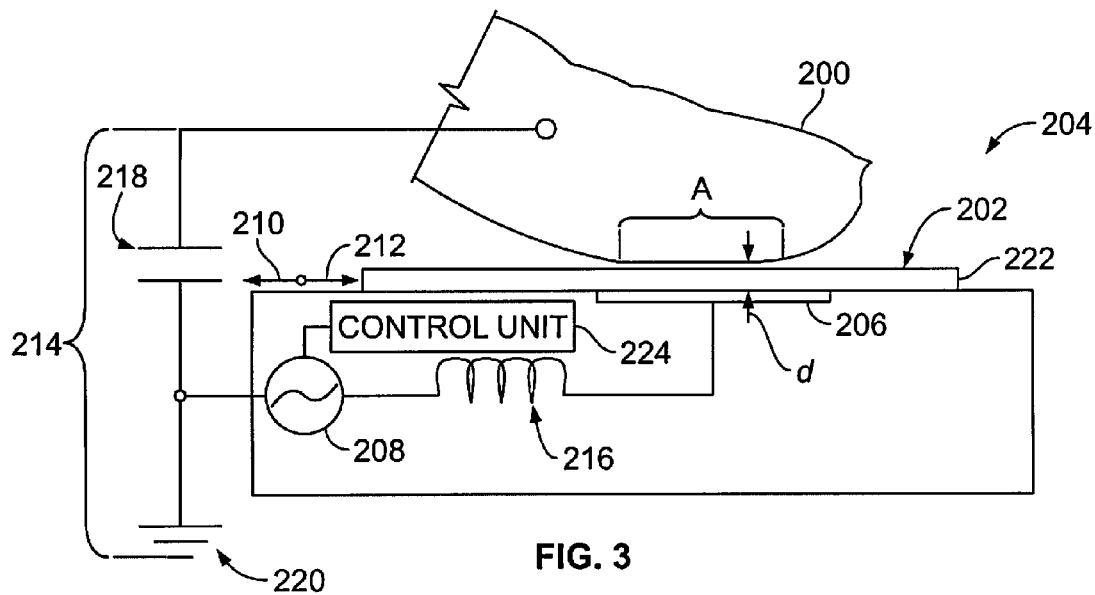
FIG. 3 is a circuit diagram of one embodiment of a fingertip engaging a touch surface of an interface device.

FIG. 3 is a circuit diagram of one embodiment of the fingertip 200 engaging a touch surface 202 of a touch interface device 204. The interface device 204 may be similar to (e.g., represent) the interface device 10 shown in FIG. 1. The touch surface 202 may represent a dielectric layer that is disposed on a conductive electrode 206 of the device 204. For example, the electrode 206 may be coupled to a first side of the touch surface 12 of the device 204 that faces the operator during use of the device 204. As described above, the touch surface 202 may represent one or more insulating layer that are disposed on the electrode 206 such that the electrode 206 is disposed beneath the insulating layer(s). In one embodiment, an insulating layer on the electrode 206 may include a layer of hafnium oxide that is one micron thick. Alternatively, another material and/or thickness may be used. In another embodiment, the electrode 206 may be disposed within the thickness of a screen, surface, or other portion of the device or below the screen, surface, or other portion such that the touch surface 202 represents the screen, surface, or other portion of the device that is disposed above the electrode 206 and that is exposed for touching by the operator.

While only a single electrode 206 is shown, several electrodes 206 may be provided, with the different electrodes 206 extending below different areas of the touch surface 202. A power source 208, such as an internal battery of the device 204 or a power source electronically derived from a battery or other source, is conductively coupled with the electrode 206 to supply voltage to the electrode 206. As described above, the voltage can be applied at a switching frequency in order to change an electrostatic normal force between the fingertip 200 and the touch surface 202. A control unit 224 is disposed within the interface device 204 in the illustrated embodiment. The control unit 224 can represent logic (e.g., software and/or hard-coded instructions) and/or associated circuitry (e.g., one or more processors, controllers, and the like) that controls application of electric energy (e.g., current) from the power source 208 to the electrode 206. The control unit 224 may control the switching frequency at which the current is applied to the electrode 206 autonomously and/or based on operator input (e.g., based on input received through touch input from the operator).

The interaction of the fingertip 200 and the electrode 206 may be modeled as a parallel plate capacitor. The capacitance of the parallel plate capacitor can be expressed based on the following relationship:

$$C = \frac{\varepsilon \varepsilon_o A}{d} \qquad \text{(Equation \#9)}$$

where C represents the capacitance, $\in$ represents the dielectric constant of the touch surface 202, $\in_0$ represents the permittivity of free space, A represents the surface area of interface between the fingertip 200 and the touch surface 202, and d represents the separation distance between the fingertip 200 and the electrode 206. Using the same parameters described above in connection with FIG. 1, Equation #9 yields a capacitance of 442 picoFarads (pF). Alternatively, another capacitance may be derived from Equation #9. When the power source 208 supplies voltage that is switched at a switching frequency of 10 kHz, an impedance of the capacitor is 36 KiloOhms (KΩ), and if the capacitor is excited at 150 V, the reactive current is 4 milliAmps (mA).

The power consumption of the capacitor may be relatively low since the electric field does no real work on the fingertip 200. The power losses may be limited due to the finite conductivity of the electrode 206 and the fingertip 200. For example, if the electrode 206 is assumed to have a conductivity of 1 kiloOhms (kΩ) (transparent conductors such as ITO typically exhibit resistivities of 50-200 Ω/square) and 150 V is supplied to the electrode 206, then the electrode 206 may only dissipate 16 milliWatts (mW).

In order to generate relatively high voltages from the power source 208, a resonant circuit 214 may be formed. The circuit 214 includes an inductive element 216 (e.g., an inductor) placed in series with a capacitor 218 and the power source 208. The capacitor 218 can represent the effective capacitance provided by the capacitor formed by the fingertip 200 and the electrode, and additional capacitance of other electrodes 206 that are excited by the power source 208, but are not disposed opposite of the fingertip 200. The capacitance of the capacitor 218 can be based on a variety of one or more other factors, including the capacitance of the fingertip 200 to a ground reference 220, the capacitance of the skin of the fingertip 200, and/or the capacitance of the touch surface 202. The circuit 214 can be an LC resonant circuit that, when tuned to the frequency of excitation or the switching frequency of the electrode 206, can provide a gain in the voltage supplied by the power source 208 to the electrode 206. Alternatively, another technique of generating higher voltage, such as an electrical transformer or a voltage ladder, may be used.

The swirling motion of the touch surface 12 (e.g., disposed below the electrode 206) may also move the electrode 206 and the touch surface 202. This motion may be provided by moving the touch surface in opposite lateral directions (in and out of the page of FIG. 2) and in opposite transverse directions 210, 212. A swirl may include the movement of the touch surface in a first lateral direction, then in a first transverse direction 210, then in a second lateral direction that is opposite of the first lateral direction, then in the second transverse direction 212. The time period required for moving the touch surface in a looped path (e.g., the time period required for moving a single point on the touch surface in a circular path or a generally ringed path) may be referred to as a swirl period. The term swirl is used here even for motions that are degenerate shapes with zero spatial area, or are spatially asymmetric, or are not strictly periodic. The time period over which voltage is supplied to the electrode 206 may be referred to as an excitation period. In one embodiment, the excitation period is based on the swirl period. For example, the electrostatic normal force between the fingertip 200 and the electrode 206 may be increased when the excitation period is one half of the swirl period. Alternatively, a longer or shorter excitation period may be used.

Figure 4:
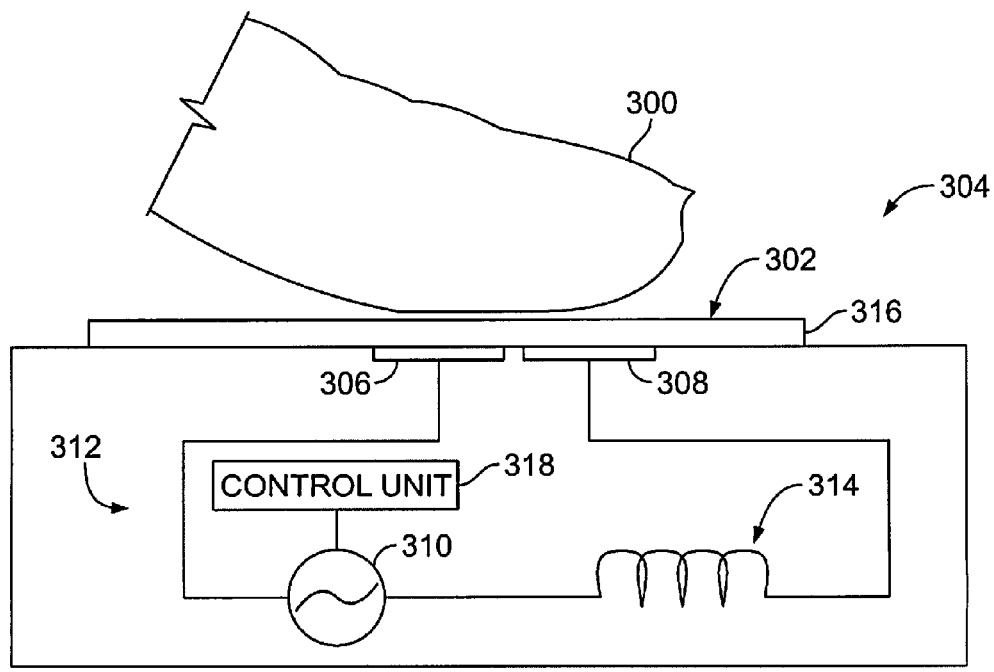
FIG. 4 is a circuit diagram of a fingertip engaging another embodiment of a touch surface of an interface device.

FIG. 4 is a circuit diagram of a fingertip 300 engaging another embodiment of a touch surface 302 of an interface device 304. Similar to as described above, the touch surface 302 can represent the surface of the device that is touched by an operator, such as an insulating layer disposed above electrodes 306, 308 or a portion of a screen, surface, or other portion of the device 304 that is exposed above the electrodes 306, 308 to accept touch from the operator.

A plurality of conductive electrodes 306, 308 is disposed below the touch surface 302. While only two electrodes 306, 308 are shown, additional electrodes 306, 308 may be provided, with the different electrodes 306, 308 extending below different areas of the touch surface 302. A power source 310, which may be driven by an internal battery of the device 304, is conductively coupled with the electrodes 306, 308 to supply voltage to the electrodes 306, 308. As described above, the power source 310 can provide voltage to the electrodes 306, 308 at a switching frequency to change an electrostatic normal force between the fingertip 300 and the touch surface 302. A control unit 318 is disposed within the interface device 304 in the illustrated embodiment. The control unit 318 can represent logic (e.g., software and/or hard-coded instructions) and/or associated circuitry (e.g., one or more processors, controllers, and the like) that controls application of electric energy (e.g., current) from the power source 310 to the electrodes 306, 308. The control unit 318 may control the switching frequency at which the current is applied to the electrodes 306, 308 autonomously and/or based on operator input (e.g., based on input received through the touch surface 302).

The interaction of the fingertip 300 with the touch surface 302 in the position shown in FIG. 3 causes the fingertip 300 to form a parallel plate capacitor concurrently or simultaneously with both of the electrodes 306, 308. In order to generate relatively high voltages from the power source 310, a resonant circuit 312 may be formed. The circuit 312 includes an inductive element 314 (e.g., an inductor) placed in series with the power source 310 and the capacitor formed by the fingertip 300 and the electrodes 306, 308. The circuit 312 can be an LC resonant circuit that, when tuned to the frequency of excitation or the switching frequency of the electrodes 306, 308, can provide a gain in the voltage supplied by the power source 310 to the electrodes 306, 308.

In another embodiment, one or more other circuits or methods may be used to supply relatively high voltage from the power source. For example, one or more transformers and/or voltage ladders may be included in the circuit 214 and/or 312. As described above, the switching frequency at which the power source 208, 310 switches the polarity of the voltage supplied to the electrodes 206, 306, 308 may be half of the swirling frequency of the touch surface 302. For example, because both positive and negative voltages generate electrostatic attractive force between the fingertip 300 and the electrodes 206, 306, 308, the switching frequency may be cut in half relative to the swirling frequency in order to generate electrostatic attractive forces only once during a cycle.

If, in a given application, it is desirable to resist the motion of the fingertip 200, 300 across the touch surface 202, 302 rather than push the fingertip 200, 300 in some direction, voltage can be applied to the electrodes 206, 306, 308 throughout an entire swirl period and/or the touch surface 202, 302 may not be swirled.

During the swirling motion of the touch surface, points on the touch surface 202, 302 may execute relatively small-amplitude circular motions about axes that are normal to the touch surface. For example, if $(x_o, y_o)$ represent coordinates of a point on the touch surface when the touch surface is at rest, then the coordinates of the same point (e.g., the point of interest 14 shown in FIG. 1) during the swirling motion may be represented as:

$$(x_0+\delta \cos(\omega t), y_0+\delta \sin(\omega_m t)) \qquad \text{(Equation \#10)}$$

where $x_0$ represents an initial position of the point of interest 14 along a first axis disposed in the plane of the touch surface 12, 202, 302 (e.g., the x-axis shown in FIG. 1), $y_0$ represents an initial position of the point along a different, second axis that is perpendicular to the first axis and that is disposed in the plane of the touch surface 202, 302 (e.g., the y-axis shown in FIG. 1), $\delta$ represents the amplitude of the swirling motion, $\omega$ represents the frequency of the swirling motion (e.g., the swirling frequency), and t represents time.

A variety of different actuation assemblies may be used to create the swirling motion of the touch surface 12. For example, voice coil actuators coupled with the touch surface 12 could be used. As another example, piezoelectric elements may be provided as actuators placed between the touch surface 12 and a frame or housing of the interface device 10, 204, 304 (e.g., the outer housing 18). The actuation assemblies (or "actuators") may be controlled by a control unit of the interface device, such as the control units 224, 318.

Piezoelectric elements may be composed of hard materials such as quartz or PZT, or of soft or polymeric materials. The disposition of the actuators may along the edges of the touch surface 12, 202, 302, or distributed across the surface of the touch surface 12, 202, 302, and the distribution of the actuators may be uniform or intermittent.

Figure 5:
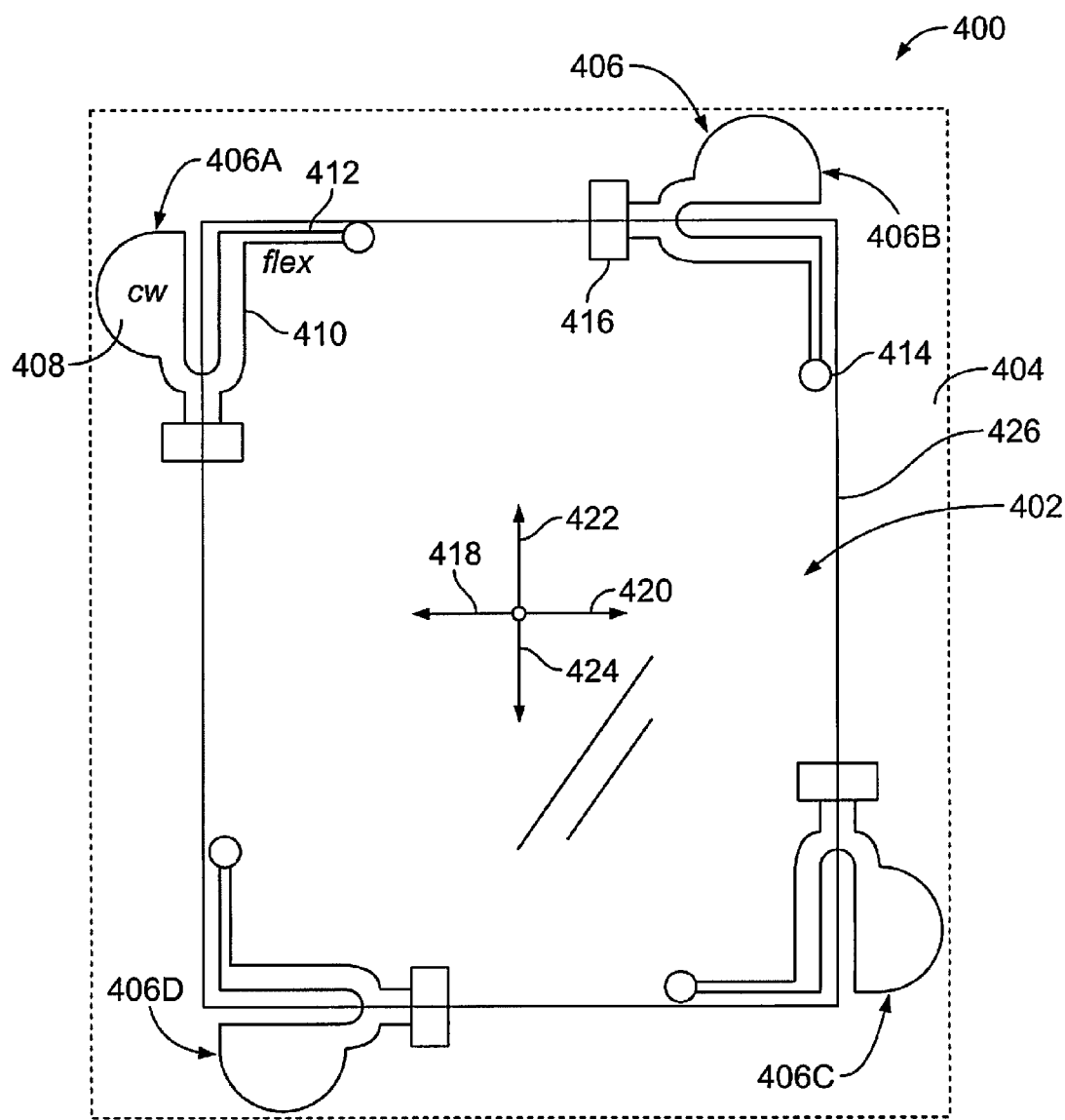
FIG. 5 is a top view of another embodiment of a touch interface device.
Figure 6:
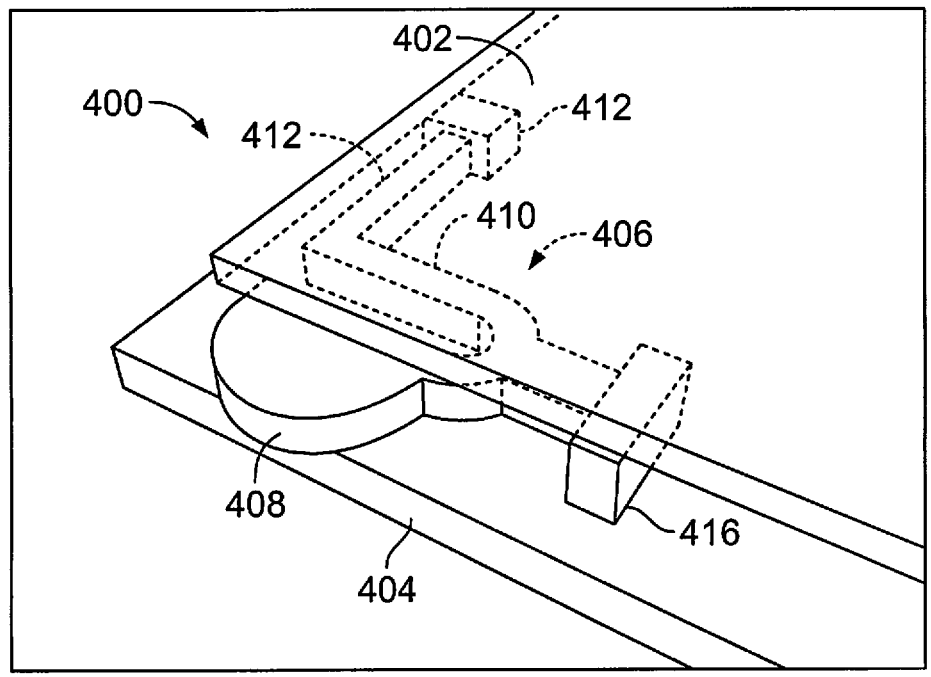
FIG. 6 is a perspective view of a swirling actuator of the interface device shown in FIG. 5.
Figure 7:
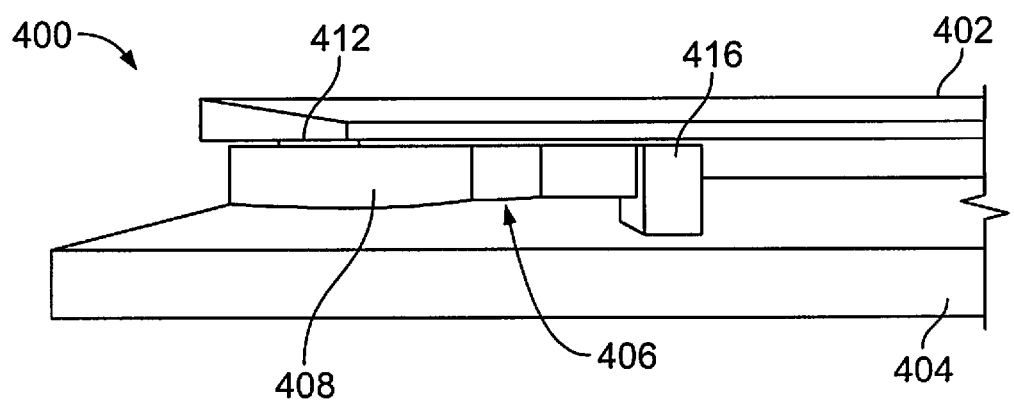
FIG. 7 is a side view of the swirling actuator shown in FIG. 6.

FIG. 5 is a top view of another embodiment of a touch interface device 400. FIG. 6 is a perspective view of a swirling actuator 406 of the interface device 400 shown in FIG. 5. FIG. 7 is a side view of the swirling actuator 406 shown in FIG. 6. The device 400 may be similar to one or more of the interface devices described above, such as the devices 10, 204, 304 shown in FIGS. 1, 3, and 4. The device 400 may use a swirling motion of a touch surface 402 of the device 400 and/or electrostatic forces to change a surface friction of the touch surface 402. The device 400 includes an outer housing or frame 404 that extends around a screen 426, similar to the outer housing or frame 18 (shown in FIG. 1). The touch surface 402 may be similar to the touch surface 12 shown in FIG. 1. The frame 404 is shown in phantom view in FIG. 4. The frame 404 may comprise a portion of the exterior of the device 400. The screen 426 may be a display or other touch sensitive portion of the device 400.

The device 400 includes the actuators 406 that provide a swirling motion to the touch surface 402. The actuators 406 are generally referred to by the reference number 406 and individually referred to by the reference numbers 406A, 406B, 406C, and 406D. While only four actuators 406 are shown, alternatively, a smaller or greater number of actuators 406 may be used.

In the illustrated embodiment, the touch surface 402 is mounted to the frame 404 by the actuators 406. The actuators 406 have a tuning fork shape that includes a bifurcation with two tines 408, 410 and an elongated extension 412 from one of the tines 410. The actuators 406 are coupled with the touch surface 402 by mounts 414 and with the frame 404 by mounts 416. In one embodiment, the actuators 406A and 406C work in concert and the actuators 406B and 406D work in concert to provide the swirling motion.

The actuators 406 may operate similar to tuning forks in that the tines 408, 410 of each actuator 406 can move toward and away from each other. The movement of the tines 410 that are coupled with the touch surface 402 cause movement of the touch surface 402 while the tines 408 act as counterweights to avoid imparting too great of a reaction force on the frame 404. For example, movements of the tines 410 for the actuators 406A and 406C can move the touch surface 402 in opposing lateral directions 418, 420 while movements of the tines 410 for the actuators 406B and 406D can move the touch surface 402 in opposing transverse directions 422, 424. It will be appreciated that other geometries are possible with no obvious visual similarity to one another, but which use the tuning fork principle so that portions of the touch surface and another massive element, compliantly connected to one another, create a resonant system that imparts vibration only modestly or not at all to motions of the frame.

In operation, the tines 408, 410 of each actuator 406 move out of phase with each other so that a reduced reaction force propagates to the frame 404. Unlike an actual tuning fork, however, the tines 408, 410 may not be identical. For example, the tines 410 may be coupled to the touch surface 402 by the extensions 412. Approximately half of the mass of the touch surface 402 is added to the masses of the tines 410 and the other half of the mass of the touch surface 402 is added to the tines 408. To achieve balance, the tines 408 are larger (e.g., have greater mass) to form counterweights (cw). The actuators 406A and 406C work together to drive side-to-side movement of the touch surface 402 along the lateral directions 418, 420. The actuators 406B and 406D work together to drive up-and-down movement of the touch surface 402 along the transverse directions 422, 424. The extensions 412 can allow the two axes of motion (e.g., along the lateral directions 418, 420 and along the transverse directions 422, 424) to move simultaneously for swirling of the touch surface 402. Other directions of motion can also be used and it is not necessary that the actuators be specialized to orthogonal directions.

The actuators 406 may be actuated in various ways. For instance, piezoelectric actuators may be laminated to the tines 410, or bending mode piezoelectric actuators may be placed between the tines 408, 410. Alternatively, electrostatic actuation of the tines 408, 410 may be used. The actuators can cause the tines 408 and/or 410 to move and thereby cause the touch surface 402 to move in the lateral directions 418, 420 and/or transverse directions 422, 424 to create the swirling motion of the touch surface 402. In one embodiment, the actuators 406 are individually controlled. For example, the magnitude and/or frequency of movements of the tines 408 and/or 410 of the actuators 406A may differ from the magnitude and/or frequency of movements of the tines 408 and/or 410 of the actuators 406B, 406C, and/or 406D. Also, magnetic actuation can be used, in which either two coils, or a coil and a permanent magnet, create magnetic forces for purposes of actuation.

A control unit (such as one similar to the control unit 224 and/or 318) and power source (such as one similar to the power source 208 and/or 31) may be connected to the piezoelectric actuators, bending mode piezoelectric actuators, and/or electrodes positioned near the actuators 406. The control unit may control application of electric current to the piezoelectric actuators and/or electrodes from the power source to actuate the tines 410. With respect to using electrodes, the control unit may generate an electric field and/or magnetic field using electric current supplied to the electrodes that interact with the tines 410 to electrostatically or magnetically attract or repel the tines 410 in order to control vibration of the actuators 406.

The movements of the actuators 406 may be coordinated or synchronized. For example, the magnitude and/or frequency of movements of the tines 408 and/or 410 of the actuators 406A and 406C may be the same and/or the magnitude and/or frequency of movements of the tines 408 and/or 410 of the actuators 406B and 406D may be the same. The actuators 406 may be arranged in synchronized groups, with the tines 408 and/or 410 of the actuators 406 in each group being synchronized. With respect to the previous example, the actuators 406A and 406C may be in a first synchronized group and the actuators 406B and 406D may be in a different, second synchronized group. In one embodiment, each synchronized group may be responsible for movement of the touch surface 402 in one or more different directions. For example, the first synchronized group of the actuators 406A and 406C may move the touch surface 402 back and forth along the lateral directions 418, 420 and the second synchronized group of the actuators 406B and 406D may move the touch surface 402 back and forth along the transverse directions 422, 424.

Figure 8:
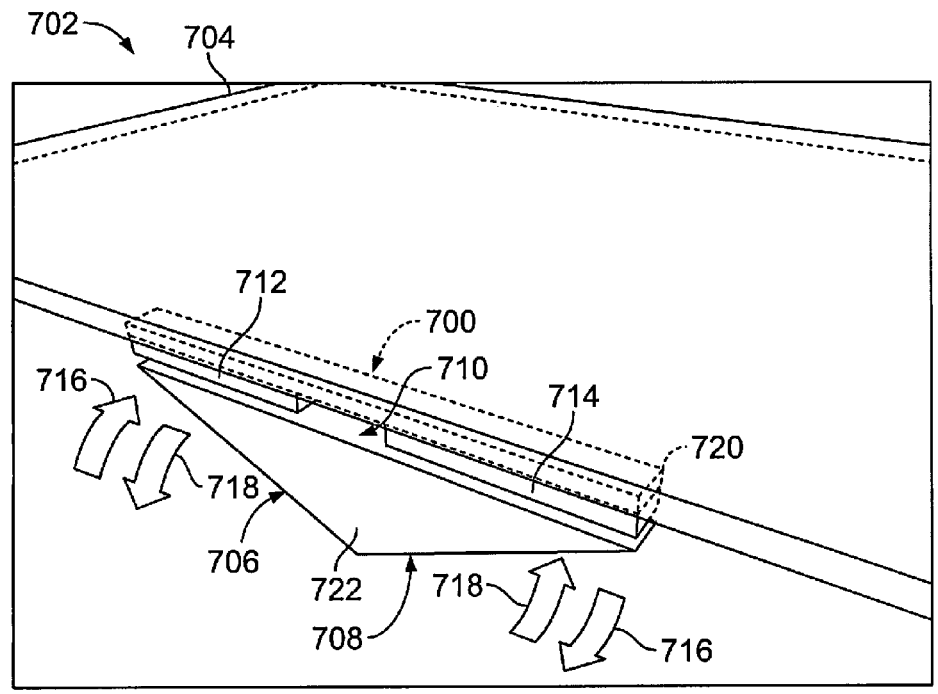
FIG. 8 is a perspective view of a swirling actuator of an interface device in accordance with another embodiment.

FIG. 8 is a perspective view of a swirling actuator 700 of an interface device 702 in accordance with another embodiment. The device 702 may be similar to one or more of the interface devices described above, such as the device 10 shown in FIG. 1. For example, the device 702 may use a swirling motion of a touch surface 704 of the device 702 and/or electrostatic forces to change a surface friction of the touch surface 704. The touch surface 704 may be similar to the touch surface 12 shown in FIG. 1.

The actuator 700 is coupled with the touch surface 704 and is actuated to create in-plane movements of the touch surface 704. In the illustrated embodiment, the actuator 700 includes a generally triangular-shaped weight 722 having a plurality of angled surfaces 706, 708. The weight 722 is joined with a flexible neck 710 that is coupled with an engagement member 720 coupled with the touch surface 704. The engagement member 720 may be affixed to the touch surface 704 beneath the area of the touch surface 704 that is engaged by fingertips. The actuator 700 includes electrodes 712, 714 that receive electric energy, such as voltage, to cause the weight 722 to move and the neck 710 to flex, thereby resulting in a rocking or rotating motion of the weight 722. For example, voltage is applied to the first electrode 712 by a power source (e.g., via one or more wired connections or electrodes disposed within the device 702) under control of a control unit (e.g., the control unit 224 and/or 318) to cause the first electrode 712 to be attracted to or repelled from another component, such as the outer housing of the device, the touch screen, or the like. The first electrode 712 can cause the neck 710 to flex and cause the weight 722 to rotate in a clockwise direction 716. The voltage can be removed (e.g., no longer supplied) to the first electrode 712 and the voltage can be applied to the second electrode 714 to cause the neck 710 to flex in a different direction and cause the weight 722 to rotate in a counter-clockwise direction 718. Alternatively, voltage may continue to be applied to both the first and second electrodes 712, 714, with the voltage applied to one of the electrodes 712 or 714 being greater than the voltage applied to the other electrode 714 or 712 in order to cause rotation in a corresponding direction, as described above.

The voltages can be applied to the electrodes 712, 714 at a resonant frequency of the device 702 to create relatively significant movements of the touch surface 704. The rocking, side-to-side motion of the weight 722 in the clockwise and counter-clockwise directions 716, 718 may cause reaction forces on the touch surface 704, which cause the touch surface 704 to move side-to-side. One or more additional actuators 700 can be placed at various points around the periphery of the touch surface 704 to allow for control of movements along opposing lateral directions (e.g., similar to the lateral directions 418, 420 shown in FIG. 4) and/or along opposing transverse directions (e.g., similar to the transverse directions 422, 424 shown in FIG. 4). The touch surface 704 may be supported on a compliant pad to allowing relatively free movement in the plane of the touch surface 704.

Figure 9:
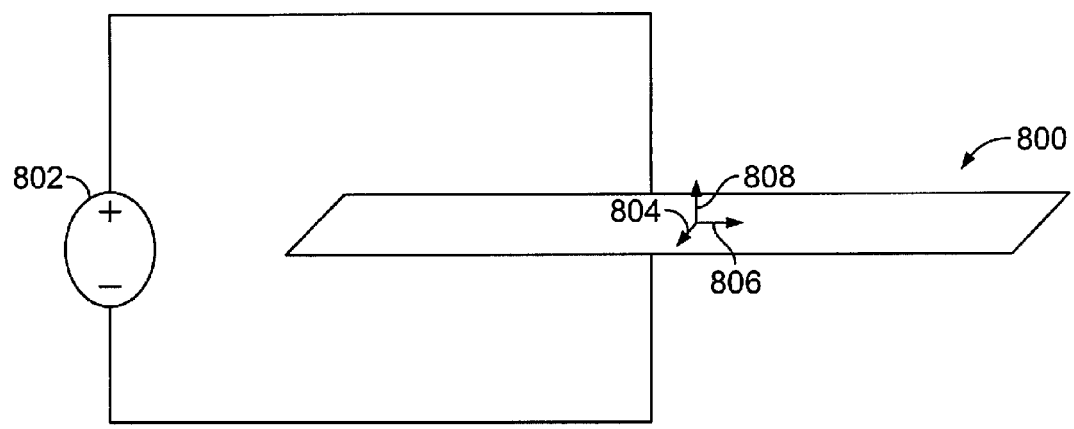
FIG. 9 is a schematic diagram of a swirling actuator that can be used to create swirling movements of a touch surface of an interface device in accordance with another embodiment.

FIG. 9 is a schematic diagram of a swirling actuator 800 that can be used to create swirling movements of the touch surface 12 of the interface device 10 in accordance with another embodiment. The actuator 800 is a planar or substantially planar body that produces a shearing motion (e.g., movement in one or more directions in the plane of the actuator 800) when voltage is applied across the actuator 800 by a power source 802. In one embodiment, the actuator 800 may be a piezoelectric shear plate actuator. The actuator 800 can provide shearing movement while being relatively thin. For example, a 0.5 millimeter thick actuator can produce approximately one micron of displacement in the plane of the actuator 800. In one embodiment, the actuator 800 may provide motion along a single axis 804, 806, or 808 when voltage is applied to the actuator 800 by the power source 802. However, additional actuators 800 can be used to permit displacement along two or more axes 804, 806, 808. For example, two actuators 800 can be stacked on top of each other to provide displacement in two orthogonal directions 804 and 806. A first actuator 800 may be below a second actuator 800. The first actuator 800 may provide movement (e.g., by expanding or contracting) along the first axis 804 when voltage is supplied by the power source 802 and the second actuator 800 may provide movement (e.g., by expanding or contracting) along the second axis 806 when the same or different voltage is supplied by the same or a different power source 802.

Alternatively, different portions of the actuator 800 may be polled during fabrication to activate along different axes of motion, for instance in a checkerboard pattern. For example, the actuator 800 may be divided into several portions that each may receive voltage from the power source 802 independent of the other portions. A first portion that receives voltage may move (e.g., contract or expand) while other portions do not move or move in other directions.

Figure 10:
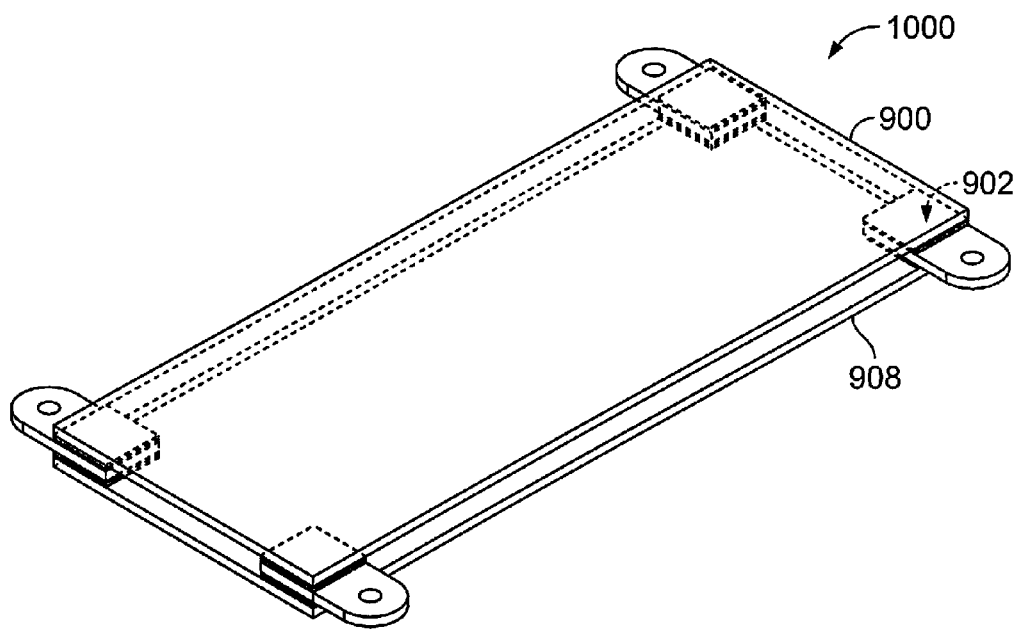
FIG. 10 is a perspective view of a haptic system that includes a touch surface of an interface device in accordance with another embodiment.
Figure 11:
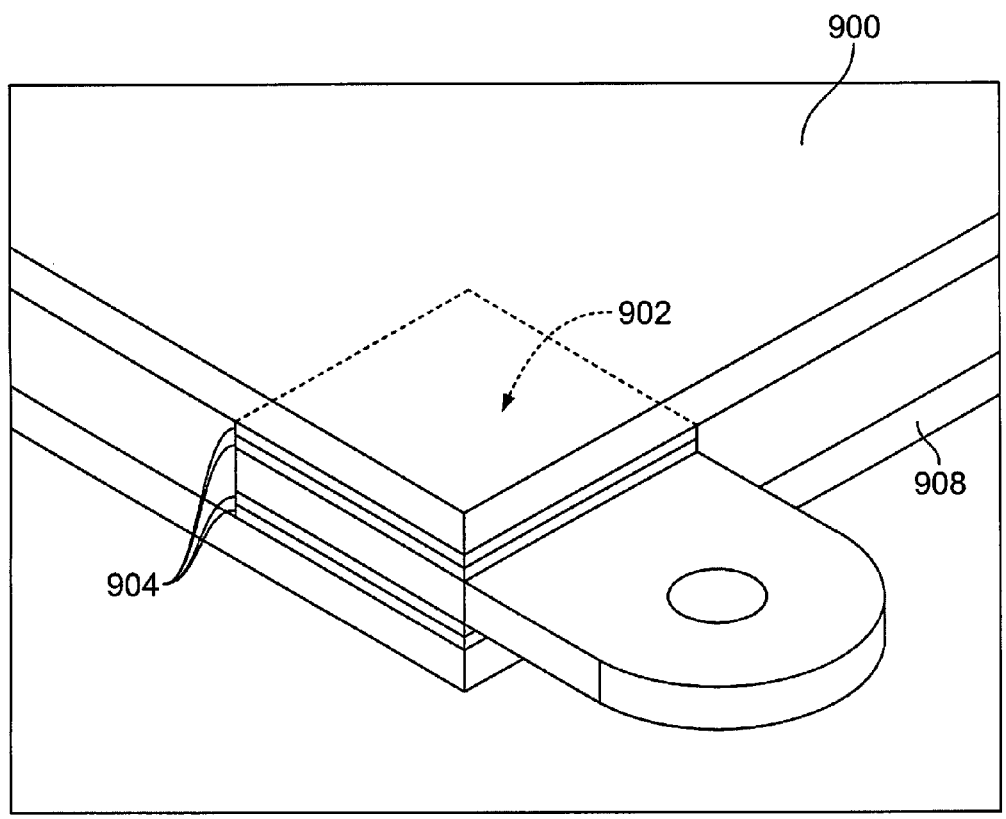
FIG. 11 is a perspective view of mounting tabs coupled with a touch surface shown in FIG. 10 in accordance with one embodiment.

FIG. 10 is a perspective view of a haptic system 1000 that includes a touch surface 900 of an interface device (e.g., the interface device 10 shown in FIG. 1) in accordance with another embodiment. FIG. 11 is a perspective view of mounting tabs 902 coupled with the touch surface 900 in accordance with one embodiment. The touch surface 900 has four mounting tabs 902 coupled with the corners of the touch surface 900. Alternatively, a different number of the mounting tabs 902 may be coupled with the touch surface 900 and/or the mounting tabs 902 may be coupled elsewhere with the touch surface 900. The mounting tabs 902 include a plurality of shear plate actuators 904, such as the actuator 800 shown in FIG. 9. The different shear plate actuators 904 in a single mounting tab 902 that is disposed at a corner of the touch surface 900 may create displacement of the mounting tab 902 and the touch surface 900 along different directions. For example, a first shear plate actuator 904 may move the touch surface 900 in a first direction (for example, along an x-axis) in the plane of the touch surface 900 while a second shear plate actuator 904 in the same mounting tab 902 may move the touch surface 900 in a second direction (for instance, along a y-axis). A third shear plate actuator 904 may move the touch surface 900 in a third direction along a y-axis in the plane of the touch surface 900 and a fourth shear plate actuator 904 in the same mounting tab 902 may move the touch surface 900 in an opposite fourth direction.

A reaction plate 908 may also be coupled to the actuators 902. The reaction plate 908 may have the same or approximately the same mass as the touch surface 900. The reaction plate 908 can assist in reducing or eliminating reaction forces caused by the mounting tabs 902 moving the touch surface 900. For example, a third and fourth shear plate actuator 904 may move the reaction plate 908 in an opposite direction as the touch surface 900. By swirling the touch surface 900 and the reaction plate 908 in opposite directions, reaction forces at the four mounting tabs 902 can be reduced or cancelled out. The reaction plate need not necessarily be a complete plate nor identical to the top plate; this was used as an example. The reaction plate may be smaller with more concentrated mass, and it may be broken up into several sections.

The haptic effects created by a touch device that includes the touch surface 900 can be combined with technologies for measuring the position and/or movement of one or more fingertips, and can be combined with graphical and audio output. For example, the reaction plate 908, whether the same in properties to the top plate 900 or not, may have another primary purpose in the device as well. For instance, the reaction plate 908 may itself be an LCD or other visual display, or may incorporate projective capacitive finger position sensing, or another type of finger position sensing, or may have both purposes. Because the motions of the top plate 900 and the reaction plate 908 relative to each other may be small (e.g., on the order of microns), the motion may cause little to no disruption to visual or sensing or tactile functions. It can be an objective in the design of devices (e.g., mobile devices), to minimize or significantly reduce thickness and weight, and so a combined purpose for the reaction plate 908 can be advantageous. Similarly, the top plate 900 may have more than one function, for instance it may not only cause lateral forces on a finger, but may also incorporate finger position sensing, or visual display. Use of the top surface 900 as an acoustic speaker surface can also be incorporated into its functions without necessarily interfering with any of its other purposes. The top surface 900 can also be used as an acoustic proximity sensor in order to measure the distance to a user's face or hand or other body part or that the device has been placed in a pocket, which is a determination that has proven to be needed in mobile device applications. Additionally the combination of the top plate 900 and the reaction plate 908 can be used in the production of low frequency vibrations in service of a vibrating alert signal. The reaction plate 908 may be combined with the mechanisms needed for many of the other functions needed in a mobile device.

The number and/or arrangement of the mounting tabs 902 may be adjusted. In particular, it may be useful to place the mounting tabs 902 no farther apart than the wavelength of compression/extension sounds waves at a frequency of interest. Doing this can help to ensure that the entire touch surface 900 moves in unison.

In contrast to one or more of the embodiments described above, the actuators that move the touch surface may be positioned "beneath" the touch surface (e.g., on a side of the touch surface that is opposite of the side that is engaged by the operator). Placing the actuators below the touch surface, as opposed to along the outer edges of the touch surface, can allow for the actuators to be distributed "below" larger touch surfaces than the actuators that may be disposed along outer edges of the touch surface. For example, edge-based actuation that involves the actuators disposed along the outer edges of the touch surface can impose practical limits on the size of the active haptic touch surface. These limitations can occur when high frequencies, for example greater than 20 kHz, are used for the swirling motion of the touch surface. At such high frequencies, materials of the touch surface (such as glass) may not act as a perfectly solid material. Vibration patterns may occur in which one region of the touch surface vibrates out of phase with another region, and in which other regions exhibit only very small vibration amplitudes. The characteristic length over which these effects become important can be based on the wavelength of the sound waves that travel through the touch surface. If the touch surface is glass (speed of sound ~4000 m/sec) and the swirl frequency is 20 kHz, then this wavelength is 3.2 cm.

Because it is often desirable to have considerably larger length and width dimensions to the touch surface, it can be helpful to distribute actuators over much more of the surface instead of placing them strictly at the edges. Distribution of the actuators "below" the touch surface can ensure that regions of the touch surface considerably larger than the wavelength of sound are swirling in synchrony.

Figure 15:
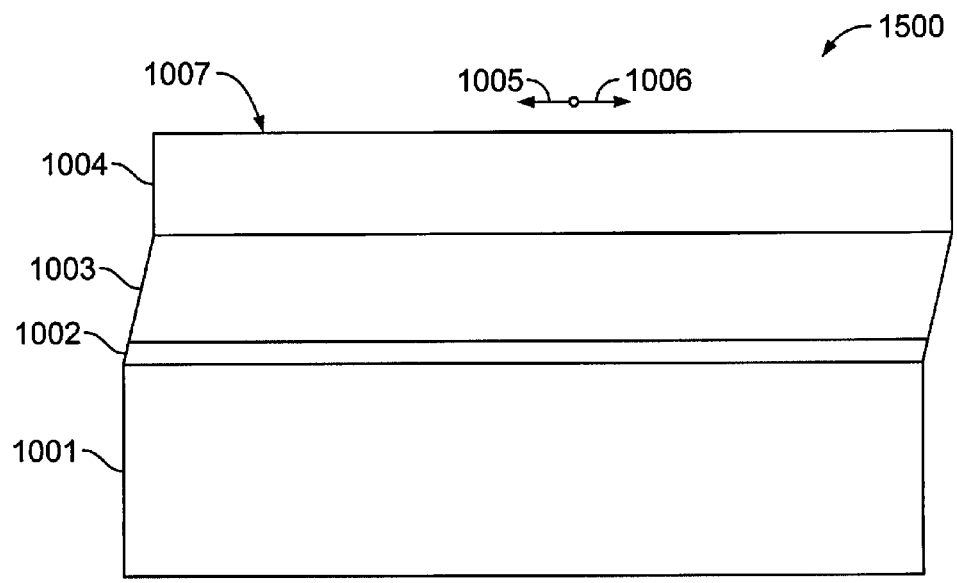
FIG. 15 is a schematic cross-sectional view of one embodiment of a distributed actuation system for a touch interface device.

FIG. 15 is a schematic cross-sectional view of one embodiment of a distributed actuation system 1500 for a touch interface device. The system 1500 may be used to produce movement, such as swirling movement, of a touch surface of a touch interface device, such as the surface 12 of the device 100 shown in FIG. 1. In FIG. 15, a base layer or portion 1001 of the outer housing 18 of the touch interface device is disposed on one side of a distributed actuator layer 1002. A compliant layer 1003 is disposed on the opposite side of the distributed actuator layer 1002 such that the distributed actuator layer 1002 is between the base portion 1001 and the compliant layer 1003. The compliant layer 1003 is located between a screen 1004 and distributed actuator layer 1002. The screen 1004 includes a touch surface 1007, such as the touch surface 12 described above. In one embodiment, the screen 1004 can be a glass layer that is 0.5 mm thick and the compliant layer 1003 may be a polydimethylsiloxane (PDMS) layer that is 0.05 mm thick. Alternatively, other materials and/or other thicknesses may be used in another embodiment.

The system 1500 can exhibit a shear resonance that results in side-to-side motion along arrows 1005, 1006 of the touch surface 1007 (e.g., along the x-axis shown in FIG. 1) at about 20 kHz. Alternatively, the shear resonance may occur at another frequency. Additionally or alternatively, the shear resonance of the screen 1004 may occur in different directions, such as along directions that extend out of and into the plane of FIG. 15 (e.g., along the y-axis shown in FIG. 1). By exciting this shear resonance along both in-plane axes (x-axis and y-axis) of the screen 1004, swirling motion of the touch surface 1007 can be produced, similar to as described above in connection with other embodiments. Resonance in the motion of the screen 1004 can have the effect of increasing amplitude of the motion of the screen 1004 relative to the motion of the actuator layer 1002.

Figure 16:
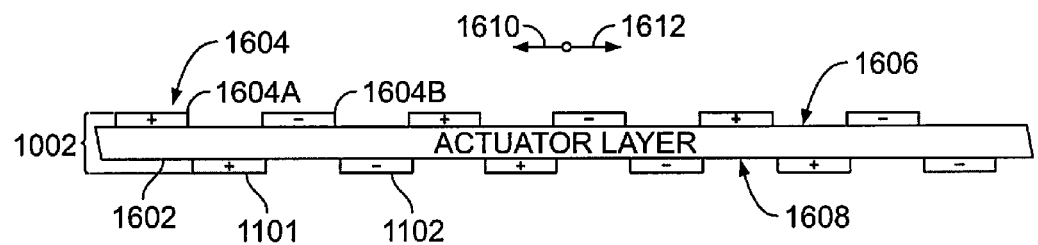
FIG. 16 illustrates a cross-sectional view of an actuator layer shown in FIG. 16.

FIG. 16 illustrates a cross-sectional view of the actuator layer 1002 shown in FIG. 16. The actuator layer 1002 may include a relatively thin, compliant dielectric layer 1602 with a pattern of conductive shear electrodes 1604 (e.g., shear electrodes 1604A, 1604B) on both sides 1606, 1608 of the dielectric layer 1602. The shear electrodes 1604 on the side 1606 of the layer 1602 may be referred to as a first group of shear electrodes 1604 and the shear electrodes 1604 on the opposite side 1608 may be referred to as a second group of shear electrodes 1604. Alternatively, the shear electrodes 1604 may be disposed only on one side 1606 or 1608 of the dielectric layer 1602 and not on the opposite side 1608 or 1606. A control unit (e.g., similar to the control unit 224 and/or 318 shown in FIGS. 2 and 3) controls application of electric current to the shear electrodes 1604 from a power source (e.g., similar to the power source 208 and/or 310 shown in FIGS. 2 and 3). In one embodiment, different polarities of voltage are applied to different shear electrodes 1604 to create shear movement of the dielectric layer 1602 and/or in subsets of the dielectric layer 1602, such as movement along one or more of directions 1610, 1612 along the x-axis (as shown in FIG. 1) and/or the y-axis (also as shown in FIG. 1), such as into and out of the plane of FIG. 16.

For example, a positive voltage can be applied to the shear electrodes 1604A and a negative voltage can be applied to the shear electrodes 1604B. As a result, the positively charged shear electrodes 1604A repel away from each other and the negatively charged shear electrodes 1604B repel away from each other. Additionally, the positively charged shear electrodes 1604A may be attracted toward the negatively charged shear electrodes 1604B, and vice-versa.

The alternating pattern of shear electrodes 1604 on the sides 1606, 1608 results in a shear force being generated between the groups of shear electrodes 1604 on the opposite sides 1606, 1608. The shear force in turn causes a shear displacement of the dielectric layer 1602, such as by the side 1606 laterally moving relative to the side 1608 and/or the side 1608 laterally moving relative to the side 1606 along the x-axis and/or the y-axis. The polarity of the voltage applied to the shear electrodes 1604 can be switched at a resonant frequency of the system 1500 to excite a shear movement resonance.

In one embodiment, the dielectric layer 1602 is formed from PDMS and is 10 microns thick. Alternatively, another material and/or thickness may be used. The shear electrodes 1604 can be formed from indium tin oxide (ITO) or silver nanowires such that the shear electrodes 1604 are transparent or light transmissive. Alternatively, the shear electrodes 1604 may be formed from another material. The shear electrodes 1604 can be approximately 100 nanometers thick, 10 microns wide, and separated from one another by 10 micron wide gaps. Alternatively, a different thickness, width, and/or separation distance may be used. The dielectric layer 1602 and the shear electrodes 1604 may be light transmissive to allow for images presented by a display device disposed on an opposite side of the actuator layer 1002 than the screen 1004 to be visible to an operator through the screen 1004.

Figure 17:
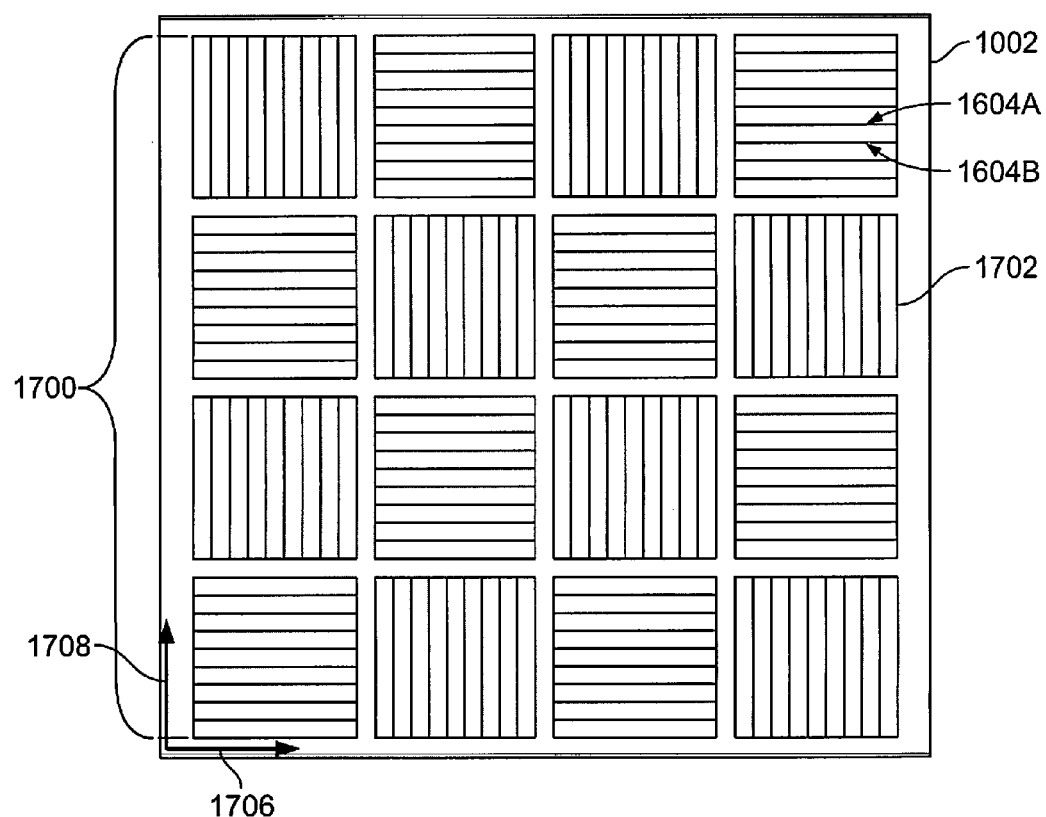
FIG. 17 illustrates a top view of the actuator layer shown in FIG. 16.

FIG. 17 illustrates a top view of the actuator layer 1002 shown in FIG. 16. The view of FIG. 17 may be a view of the side 1606 or 1608. The shear electrodes 1604 may be arranged in a checkerboard pattern 1700 across the side 1606, 1608 of the layer 1002. Within each subset 1702 (e.g., a square in the illustrated embodiment) of the pattern 1700, the shear electrodes 1604 may be alternatively arranged, such as by being elongated in different directions, as shown in FIG. 17. The subsets 1702 may each be approximately 1 cm by 1 cm in size, although other sizes and/or shapes of the subsets 1702 may be used. In order to excite resonance in both the x-axis 1706 and the y-axis 1708, a designated amount (e.g., half) of the subsets 1702 can be oriented to excite movement (e.g., vibration) of the layer 1002 along the x-axis 1706, and a remaining or other designated amount (e.g., the remaining half) of the subsets 1702 can be oriented to excite movement (e.g., vibration) of the layer 1002 along the y-axis 1708. Alternatively, another arrangement of the shear electrodes 1604 may be provided. For example, the shear electrodes 1604 may be arranged in a hexagonal pattern, a lattice pattern (e.g., with the shear electrodes 1604 being elongated and arranged to extend over each other to form the lattice without the shear electrodes 1604 being conductively coupled with each other), and the like.

The pattern of shear electrodes 1604 can be produced using techniques such as photolithography, laser ablation, and the like. It should be understood that the materials, dimensions, and patterns/geometries described here are examples only, and may be replaced with others that produce the same result of swirling motion of the layer 1002 and screen 1004. In addition, it is not necessary to operate at a resonant frequency, although doing so can be an efficient way to produce the necessary surface motions without excessive actuator effort.

Other approaches to distributed actuation of the screen 1004 are also possible. For instance, a piezoelectric shear plate (e.g., the actuator 800 in FIG. 8) can be laminated to the base 1001 shown in FIG. 1. A transparent piezoelectric material such as quartz or Lead-Lanthanum-Zirconate-Titanate (PLZT) may be used along with transparent electrodes (e.g. ITO or an array of silver nanowires).

In one embodiment, no reaction mass is included in the system 1500 shown in FIGS. 15 through 17. Instead, the remainder of the device 100 that includes the system 1500 (e.g., the display, electronics, battery, and the like) can provide a reaction mass. The mass of the moving surface (e.g., the screen 1004 and the layer 1003) can be relatively small compared to the rest of the device 100, such as the outer housing 18 of the device 100. Alternatively, a reaction mass could be included in the system 1500.

Figure 12:
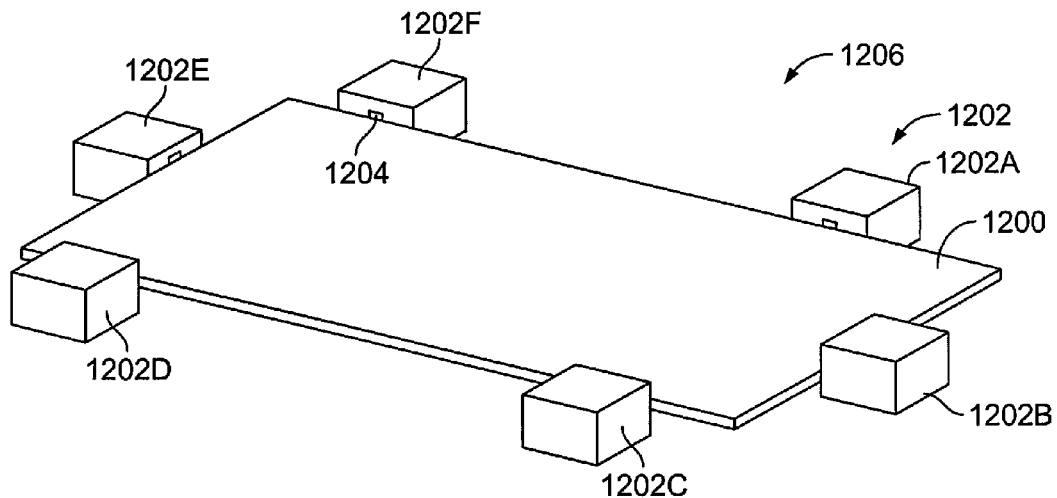
FIG. 12 is a perspective view of a haptic system that includes a touch surface of an interface device in accordance with another embodiment.

FIG. 12 is a perspective view of a haptic system 1206 that includes a touch surface 1200 of an interface device (e.g., the interface device 10 shown in FIG. 1) in accordance with another embodiment. In the illustrated embodiment, the swirling motion of the touch surface 1200 is provided by coupling rotational motors 1202 (e.g., motors 1202A-F) to one or more points of the touch surface 1200. The motors 1202 may carry eccentric loads that create movements in the touch surface 1200 due to reaction forces generated by rotation of the eccentric load. For example, the motors 1202 may be joined with the touch surface 1200 directly or by a shaft or other component 1204 that translates rotation of the eccentric load within the motors 1202 to movement of the touch surface 1200. These movements can cause a swirling motion of the touch surface 1200, as described above. Examples of such motors 1202 having eccentric loads can include the vibrator motors in pagers. The rotational speeds of the motors may be at least 20 kiloHertz (kHz) in one embodiment. In one embodiment, the eccentric mass of the motors 1200 may not rotate. Instead, a reaction mass rotor may be moved in a circular displacement motion without rotating, such as by piezoelectric actuation.

Alternatively, the touch surface of the interface device may not move in a swirling motion as described above. For example, a single-axis vibration of the touch surface may be used, with the location of a point on the touch surface represented as:

$$(x_0+\delta \cos(\alpha \sin(\omega_m t)), y_0+\delta \sin(\alpha \sin(\omega_m t)))$$ (Equation #11)

where $x_0$ represents an initial position of the point along a first axis in the plane of the touch surface, $y_0$ represents an initial position of the point along a different, second axis that is perpendicular to the first axis and that is in the plane of the touch surface, $\delta$ represents the amplitude of the vibration, $\omega_m$ represents the frequency of the vibration, t represents time, and a represents an axis of the single-axis vibration. The axis of the single-axis vibration may be oriented along a desired direction of force that is applied to the fingertip. For example, the axis may be oriented in or parallel to the plane defined by the touch surface, or may be oriented transverse (e.g., perpendicular, acutely, or obliquely oriented) to the plane defined by the touch surface.

In one or more of the previously described embodiments, the swirling motion of the touch surfaces may be planar motions of the touch surface having two degrees of freedom (2dof). For example, several or all points of the touch surface may have the same or approximately the same velocity at the same time, and the touch surface is translated or moved without rotation of the touch surface. While several or all of the points of the touch surface may move along a relatively small circular or other looped path, there may not be rotation of the touch surface about an axis. Instead, the entire touch surface may be moved a designated distance in a first direction along a first axis that lies in the plane defined by the touch surface (e.g., along the x-axis shown in FIG. 1), then the entire touch surface may be moved the same or different distance in a different, second direction along a second axis (e.g., along y-axis shown in FIG. 1), then the entire touch surface may be moved the same or different distance in a direction that is opposite the first direction, but along the same first axis (e.g., the x-axis), and then the entire touch surface may be moved the same or different distance in a direction that is opposite the second direction, but along the same second axis to complete the looping swirl movement.

Figure 13:
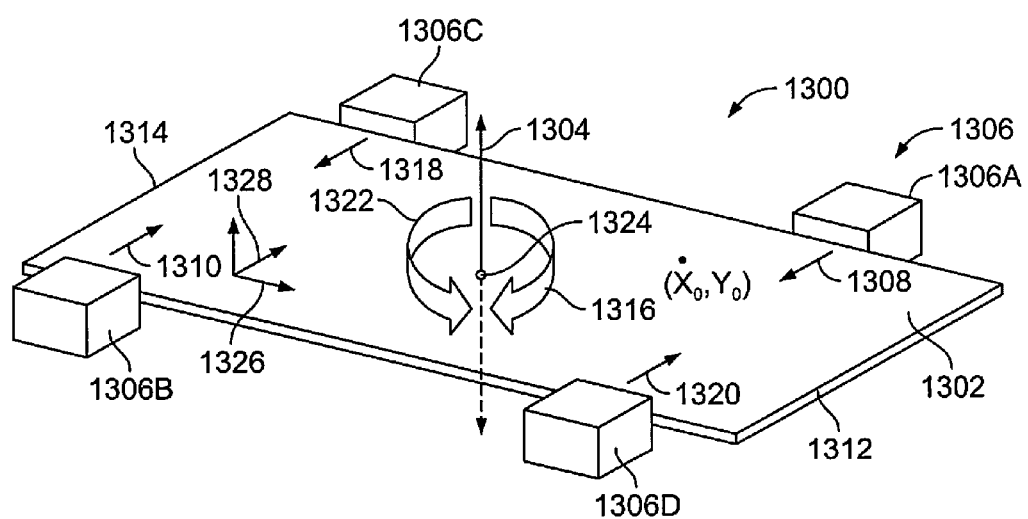
FIG. 13 illustrates a haptic system having a touch surface of a touch interface device in accordance with another embodiment.

FIG. 13 illustrates a haptic system 1300 having a touch surface 1302 of a touch interface device (such as the interface device 10 shown in FIG. 1) in accordance with another embodiment. The system 1300 provides for rotation of the touch surface 1302 in order to provide a swirling motion. For example, the system 1300 may rotate the touch surface 1302 about (e.g., around) a rotation axis 1304 that is normal to the plane of the touch surface 1302. The system 1300 can include actuators 1306 (e.g., actuators 1306A-D), such as motors, piezoelectric bodies, and the like, that actuate the touch surface 1302 to rotate or at least partially rotate the touch surface 1302 about the rotation axis 1306. For example, first and/or second actuators 1306A, 1306B may push or move the touch surface 1302 in opposite directions 1308, 1310 at or near opposite ends 1312, 1314 of the touch surface 1302 to cause the touch surface 1302 to at least partially rotate around the rotation axis 1304 in a first rotary direction 1316. Third and/or fourth actuators 1306C, 1306D may push or move the touch surface 1302 in opposite directions 1318, 1320 at or near the ends 1314, 1312 of the touch surface 1302 to cause the touch surface 1302 to at least partially rotate around the rotation axis 1304 in an opposite second rotary direction 1322.

Rotating the touch surface 1302 can cause rotation about a fixed point in the plane of the touch surface 1302 with other points in the plane (e.g., or of the touch surface 1302) rotating about the rotation axis 1304. Such a location of the fixed point may be referred to as a Center of Rotation point 1324, or COR point 1324. The location of the COR point 1324 on the touch surface 1302 may be designated as $(x_{COR}, y_{COR})$. If the touch surface 1302 is rotated in an oscillatory rotation about the rotation axis 1304 at a frequency $w_r$, then motion, or changes in location, at a point of interest $(x_o, y_o)$ of the touch surface 1302 that is different (e.g., spaced apart) from the COR point 1324 may be expressed as:

$$v_{X,Y} = (e(y_{COR} - y_0)\sin(w_r t), e(x_0 - x_{COR})\sin(w_r t)) \quad \text{(Equation \#12)}$$

where e represents a scale factor for amplitude of movement or rotation, $x_0$ represents an initial location of the point of interest $(x_o, y_o)$ along a first axis 1326 in the plane of the touch surface 1302, $y_0$ represents an initial location of the point of interest $(x_o, y_o)$ along a different, second axis 1328 in the plane of the touch surface 1302 and that is perpendicular to the first axis, $x_{COR}$ represents the location of the COR point 1324 along the first axis 1326, $y_{COR}$ represents the location of the COR point 1324 along the second axis 1328, $w_r$ represents the frequency of oscillation about the COR point 1324, and t represents the time since motion began. The points (e.g., locations on the touch surface 1320) that are disposed farther from the COR point 1324 may experience greater motion amplitudes relative to other points located closer to the COR point 1324. For example, the COR point 1324 may experience little or no motion amplitude while a location on the outer perimeter of the touch surface 1324 may experience significant motion during the same rotation of the touch surface 1302.

Rotary vibrations of the touch surface 1302 can allow the forces experienced by simultaneous touches of the same touch surface 1302 in different locations to be independently controlled and/or different from each other. For example, a first fingertip that touches the touch surface 1302 at the COR point 1324 may experience little to no force from the rotary vibrations while a second finger that touches the touch surface 1302 at another location that is not at the COR point 1324 can experience a force from the rotary vibrations. As a result, the forces experienced by different fingertips on the same touch surface 1302 can be individually controlled and different from each other.

In one embodiment, rotary vibrations about the COR point 1324 are combined with swirling vibrations or movements described above. For example, rotation about the COR point 1324 of the touch surface 1302 can be combined with swirling movement or vibrations of the touch surface 1302 that move the entire touch surface along a looped path. The frequencies of each movement (e.g., rotation about the COR point 1324 and the swirling motion) can be different from each other. In addition, an electric field may be applied to increase an electrostatic normal force, as described above. The application of the electric field may be synchronized with the swirling motion (e.g., the electric field may be applied at half of the swirling frequency as discussed above). At the COR point 1324, the swirling motion may be the dominant effect that affects the forces on the fingertip as the rotary vibration may apply little to no forces on the fingertip at the COR point 1324. In locations that are disposed away from the COR point 1324, the motion of the touch surface 1302 may not be synchronized with the electric field and, as a result, the average force applied on a fingertip at such locations may be small or zero. This approach can be extended further by producing not just combinations of rotational vibration and swirling, but arbitrary combinations of x motion, y motion, and rotation of the touch surface 1302.

In another embodiment, the touch surface of an interface device can be tiled with electrostatic patches. For example, the touch surface can be patterned into non-overlapping zones, such as a diamond or checkerboard pattern, which can be individually addressed, charged, and discharged with voltage to locally generate electrostatic normal forces at or near the activated zones. The phase relationships between application of the electric fields and the swirling motion may differ from each other. As a result, each zone can apply a force on a fingertip disposed at least partially within the zone to drive the fingertip in a different direction and/or with a different force magnitude than one or more other zones. As one example, a system that includes one or more of the touch surfaces described herein (and/or actuators, motors, and the like) can include the lattice of electrodes shown in described in the '564 Application and/or the '818 Application.

In another embodiment, out-of-plane vibrations of the touch surface can be provided. For example, vibrations or movements of the touch surface in directions that are oriented perpendicular or otherwise out of the plane of the touch surface may be provided by one or more of the actuators described above. Instead of or in addition to moving the touch surface within the plane defined by the touch screen (and/or in a parallel plane), the actuators may move the touch screen out of the plane, such as vertically up and down, or toward and away from the operator who is touching the touch surface. These out-of-plane vibrations can be provided at the same frequency that the surface is "swirled." If peaks or changes in the normal force due to the mechanical vibrations caused by swirling and/or out-of-plane vibrations are synchronized with the peaks or increases in the normal force due to the electric field, then the total normal force between the fingertip and the surface can be increased further.

The various actuators, motors, and the like that are used to control movement of the screens described herein may be controlled by a control unit, such as a control unit 224 and/or 318 shown in FIGS. 2 and 3. Such a control unit can control the movements created by the actuators, motors, and the like, by communicating control signals to the actuators, motors, and the like, by controlling the flow of electric current to the actuators, motors, and the like, or otherwise directing how the actuators, motors, and the like control movement of the screen.

Figure 14:
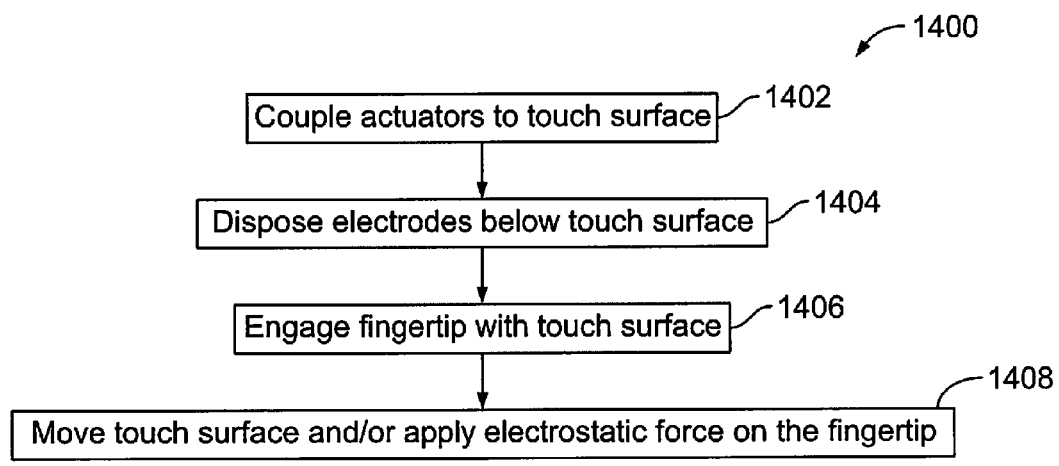
FIG. 14 is a flowchart of a method for controlling shear forces applied to a human appendage, such as a fingertip.

FIG. 14 is a flowchart of a method 1400 for controlling shear forces applied to a human appendage, such as a fingertip. The method 1400 may be used in conjunction with one or more of the systems, devices, and touch screens described herein. At 1402, actuators are coupled to a touch surface. For example, one or more of the actuators 406, 706, 800, 902, 1202, 1306 may be joined to the touch surface 12, 202, 302, 402, 702, 900, 1200, or 1302. At 1404, one or more electrodes are disposed below the touch surface. For example, one or more of the electrodes 206, 306, 308 may be disposed on a side of the touch surface 12, 202, 302, 402, 702, 900, 1200, or 1302 that is opposite of the side that is touched by an operator. Alternatively, one or more of the electrodes and/or lattices of electrodes shown and/or described in the '564 Application and/or the '818 Application may be disposed below the touch surface.

At 1406, a fingertip or other appendage is engaged with the touch surface. For example, the operator may touch the touch surface to interact with a device that includes the touch surface, such as a mobile phone, computer, input device, and the like. At 1408, the touch surface is moved and/or electrostatic force is applied to the fingertip or other appendage in order to control shear forces applied to the fingertip. As described above, the movement of the touch surface may be an in-plane swirling motion of the touch surface, an in-plane rotation of the touch surface, an out of plane motion of the touch surface, and the like. Different forces may be applied to different fingertips at different locations on the touch surface, as described above. Additionally, one or more of the forces may be a persistent force (e.g., a force that is applied as long as the fingertip engages the touch surface and/or some visual event that is shown on the touch surface and that is represented by the forces continues).

In another embodiment, a touch interface device includes a touch surface, an actuator, and an electrode. The actuator is coupled with the touch surface and is configured to move the touch surface in one or more directions. The electrode is coupled with the touch surface and is configured to impart a normal electrostatic force on one or more appendages of a human operator that engage the touch surface when an electric current is conveyed to the electrode. Movement of the touch surface by the actuator and the electrostatic force provided by the electrode are synchronized to control one or more of a magnitude or a direction of a shear force applied to the one or more appendages that engage the touch surface.

In one aspect, the movement and electrostatic force are synchronized when a frequency of repeated movements of the touch screen and a frequency of repeated application of the current (e.g., between ON vs. OFF) or switching the polarity (e.g., between positive and negative voltages) are based on each other. Alternatively, the movement and the electrostatic force may be synchronized when the movements and application of current occur at the same frequency.

In one aspect, the actuator is configured to move the touch surface such that a point of interest on the touch surface moves along a path of a loop.

In one aspect, the magnitude of the shear force that is applied to the one or more appendages that engage the touch surface increases with an increasing frequency at which the point of interest moves through the path of the loop.

In one aspect, the magnitude of the shear force that is applied to the one or more appendages that engage the touch surface increases with an increasing voltage applied to the electrode.

In one aspect, the device also includes a control unit configured to control application of the electric current to the electrode at a switching frequency that represents a frequency at which a polarity of the electric current changes. The magnitude of the shear force that is applied to the one or more appendages increases with increasing switching frequency of the electric current.

In one aspect, the actuator is configured to move the touch surface in the one or more directions that are oriented in or parallel to a plane defined by the touch surface.

In one aspect, the actuator is configured to move the touch surface by at least partially rotating the touch surface around a rotation axis.

In one aspect, the actuator is configured to move the touch surface in one or more directions oriented transverse to a plane defined by the touch surface.

In one aspect, the shear force is a non-transitory or non-vibratory force.

In one aspect, the actuator includes first and second tines that move relative to each other. The first tine is coupled with the touch surface and the second tine is decoupled from the touch surface (e.g., is not directly connected with the touch surface). At least one of the first tine or the second tine moves relative to another of the first tine or the second tine to move the touch surface in a back-and-forth direction.

In one aspect, the actuator includes a triangular-shaped weight coupled with the touch surface and one or more actuator electrodes. The actuator electrodes are configured to receive electric current to move the weight relative to the touch surface (e.g., by attracting the actuator electrodes toward or repelling the actuator electrodes from another body, such as the touch surface, a housing of the device, or other body such as a magnet). Movement of the weight causes movement of the touch surface.

In one aspect, the swirling actuator includes one or more piezoelectric actuators that move the touch surface in one or more directions when electric current is applied to the one or more actuators.

In one aspect, the actuator is coupled with the touch surface along one or more of the outer edges of the touch surface.

In one aspect, the actuator is a light transmissive actuator distributed across a side of the touch surface that is opposite of a side of the touch surface to which the electrode is coupled.

In one aspect, the actuator includes an actuator layer that generates shear movement in directions that are parallel to the touch surface and a compliant layer. The compliant layer is disposed between the actuator layer and the touch surface. The shear movement of the actuator layer creates vibratory or resonant movement of the touch surface via the compliant layer.

In one aspect, the actuator includes a dielectric layer having first and second shear electrodes. The first shear electrodes receive an opposite polarity of an electric current relative to the second shear electrodes to cause at least one of attraction or repulsion between the first and second electrodes to generate shear movement in the dielectric layer. The shear movement in the dielectric layer causes movement of the touch surface in the one or more directions.

In another embodiment, a method includes receiving a touch on a touch surface in a touch interface device by one or more appendages of a human operator, moving the touch surface in one or more directions, and applying an electric current to an electrode coupled to the touch surface to impart a normal electrostatic force on the one or more appendages of the human operator. Moving the touch surface and applying the electric current are synchronized to control one or more of a magnitude or a direction of a shear force applied to the one or more appendages that engage the touch surface.

In one aspect, moving the touch surface includes moving the touch surface such that a point of interest on the touch surface moves along a path of a loop.

In one aspect, applying the electric current includes applying the electric current to the electrode at a switching frequency that represents a frequency at which a polarity of the electric current changes. The magnitude of the shear force that is applied to the one or more appendages increases with increasing switching frequency of the electric current.

In one aspect, moving the touch surface includes at least partially rotating the touch surface around a rotation axis.

In another embodiment, another touch interface device includes a touch surface, an electrode, and an actuator. The electrode is coupled with the touch surface. The actuator is coupled with the touch surface and is configured to move the touch surface in order to generate a shear force on one or more appendages of an operator that touch the touch surface. The electrode is configured to receive an electric current to impart an electrostatic force on the one or more appendages and a direction and magnitude of the shear force on the one or more appendages are controlled by movement of the touch surface and application of the electrostatic force.

In one aspect, the actuator is configured to move the touch surface in a swirling motion such that a point of interest on the touch surface moves along a looped path.

In one aspect, the actuator is configured to at least partially rotate the touch surface around a rotation axis.

In one aspect, the actuator is configured to generate different shear forces on different appendages of the operator that concurrently touch the touch surface based on rotation of the touch surface.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter described herein without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable a person of ordinary skill in the art to practice the embodiments disclosed herein, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A touch interface device comprising: a touch surface; an actuator coupled with the touch surface and that subjects the touch surface to vibrations along one or more axes of the touch surface; and an electrode coupled with the touch surface and that imparts electrostatic forces in a direction normal to the touch surface on one or more appendages of a human operator that engage the touch surface when an alternating electric current is conveyed to the electrode, wherein the electrostatic forces vary in time and frequency, wherein the vibrations of the touch surface by the actuator and the electrostatic forces provided by the electrode each have a frequency and the respective frequencies are synchronized with one another to generate and control a magnitude and a direction of a persistent shear force applied to the one or more appendages that engage the touch surface and that is felt by the one or more appendages as a pushing force that is oriented laterally relative to the touch surface, and wherein the frequencies of said vibrations and said electrostatic forces are greater than the response bandwidth of vibration sensitivity of the one or more appendages in touch.

2. The device of claim 1, wherein the actuator is configured to move the touch surface such that a point of interest on the touch surface moves along a path of a loop.

3. The device of claim 1, wherein the magnitude of the persistent shear force increases with an increasing voltage applied to the electrode.

4. The device of claim 1, further comprising a control unit configured to control application of the alternating electric current to the electrode at a switching frequency that represents a frequency at which a polarity of the alternating electric current changes, wherein the magnitude of the persistent shear force increases with increasing switching frequency of the alternating electric current.

5. The device of claim 1, wherein the vibrations of the touch surface by the actuator and the electrostatic forces in a normal direction to the touch surface are applied at the same frequency.

6. The device of claim 1, wherein the actuator is configured to move the touch surface by at least partially rotating the touch surface around a rotation axis.

7. The device of claim 1, wherein the actuator is configured to provide the vibrations along one or more axes by moving the touch surface in one or more directions oriented transverse to a plane defined by the touch surface.

8. The device of claim 1, wherein the shear force is a non-vibratory force.

9. The device of claim 1, wherein the actuator includes first and second tines that move relative to each other, the first tine coupled with the touch surface, the second tine decoupled from the touch surface, wherein at least one of the first tine or the second tine moves relative to another of the first tine or the second tine to move the touch surface in a back-and-forth direction.

10. The device of claim 1, wherein the actuator includes a triangular-shaped weight coupled with the touch surface and one or more actuator electrodes, the actuator electrodes configured to receive electric current to move the weight relative to the touch surface, wherein movement of the weight causes movement of the touch surface.

11. The device of claim 1, wherein the actuator further comprises an actuator that causes a swirling motion, wherein the actuator includes one or more piezoelectric actuators that move the touch surface in one or more directions when electric current is applied to the one or more actuators.

12. The device of claim 1, wherein the actuator is coupled with the touch surface along one or more of the outer edges of the touch surface.

13. The device of claim 1, wherein the actuator is a light transmissive actuator distributed across a side of the touch surface that is opposite of a side of the touch surface to which the electrode is coupled.

14. The device of claim 13, wherein the actuator includes an actuator layer that generates shear movement in directions that are parallel to the touch surface and a compliant layer, the compliant layer disposed between the actuator layer and the touch surface, wherein the shear movement of the actuator layer creates vibratory or resonant movement of the touch surface via the compliant layer.

15. The device of claim 13, wherein the actuator includes a dielectric layer having first and second shear electrodes, the first shear electrodes receiving an opposite polarity of an alternating electric current relative to the second shear electrodes to cause at least one of attraction or repulsion between the first and second electrodes to generate shear movement in the dielectric layer, the shear movement in the dielectric layer causing movement of the touch surface in the one or more directions.

16. A method comprising: receiving a touch on a touch surface of a touch interface device by one or more appendages of a human operator; moving the touch surface via vibrations along one or more axes of the touch surface; and applying an alternating electric current to an electrode that is coupled to the touch surface to impart electrostatic forces in a direction normal to the touch surface on the one or more appendages of the human operator, wherein the electrostatic forces vary in time and frequency, wherein the vibrations moving the touch surface along one or more axes of the touch surface and the applying the alternating electric current to an electrode each have a frequency and the respective frequencies are synchronized to generate and control a magnitude and a direction of a persistent shear force applied to the one or more appendages that engage the touch surface and that is felt by the one or more appendages as a pushing force that is oriented laterally relative to the touch surface, and wherein the respective frequencies of said vibrations and said electrostatic forces are greater than the response bandwidth of vibration sensitivity of the one or more appendages in touch.

17. The method of claim 16, wherein moving the touch surface includes moving the touch surface such that a point of interest on the touch surface moves along a path of a loop.

18. The method of claim 16, wherein applying the alternating electric current includes applying the alternating electric current to the electrode at a switching frequency that represents a frequency at which a polarity of the alternating electric current changes, wherein the magnitude of the persistent shear force that is applied increases with increasing switching frequency of the alternating electric current.

19. The method of claim 16, wherein moving the touch surface includes at least partially rotating the touch surface around a rotation axis.

20. A touch interface device comprising: a touch surface; an electrode coupled with the touch surface; and an actuator coupled with the touch surface and configured to move the touch surface in order to generate a persistent shear force on one or more appendages of an operator that touch the touch surface and that is felt by the one or more appendages as a pushing force that is oriented laterally relative to the touch surface, wherein the electrode is configured to receive an alternating electric current to impart electrostatic forces in a direction normal to the touch surface on the one or more appendages, wherein the electrostatic forces vary in time and frequency, and a direction and magnitude of the persistent shear force are controlled by a phase relationship between respective frequencies of the vibratory movement of the touch surface by the actuator and application of the electrostatic forces, and wherein the frequencies of said vibrations and said time-varying electrostatic forces are greater than the response bandwidth of vibration sensitivity of the one or more appendages in touch.

21. The device of claim 20, wherein the actuator is configured to move the touch surface in a swirling motion such that a point of interest on the touch surface moves along a looped path.

22. The device of claim 20, wherein the actuator is configured to at least partially rotate the touch surface around a rotation axis.

23. The device of claim 22, wherein the actuator is configured to generate different persistent shear forces on different appendages of the operator that concurrently touch the touch surface based on rotation of the touch surface.

* * * * *